US012307441B2

(12) United States Patent
Nagahora et al.

(10) Patent No.: US 12,307,441 B2
(45) Date of Patent: May 20, 2025

(54) ELECTRONIC PAYMENT SYSTEM AND ELECTRONIC PAYMENT METHOD

(71) Applicant: Hitachi, Ltd., Tokyo (JP)

(72) Inventors: Suguru Nagahora, Yokohama (JP); Nishio Yamada, Tokyo (JP); Yasunori Hashimoto, Tokyo (JP); Tomokazu Sakai, Tokyo (JP); Kaiho Fukuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 151 days.

(21) Appl. No.: 18/022,338

(22) PCT Filed: Jul. 27, 2021

(86) PCT No.: PCT/JP2021/027808
§ 371 (c)(1),
(2) Date: Feb. 21, 2023

(87) PCT Pub. No.: WO2022/044662
PCT Pub. Date: Mar. 3, 2022

(65) Prior Publication Data
US 2023/0325822 A1    Oct. 12, 2023

(30) Foreign Application Priority Data
Aug. 31, 2020   (JP) ................... 2020-145947

(51) Int. Cl.
*G06Q 20/38*   (2012.01)
(52) U.S. Cl.
CPC ..... *G06Q 20/3825* (2013.01); *G06Q 20/3827* (2013.01); *G06Q 20/3829* (2013.01)
(58) Field of Classification Search
None
See application file for complete search history.

(56) References Cited

U.S. PATENT DOCUMENTS 6,629,081 B1 *   9/2003   Cornelius .............. G06Q 20/04
                                                                    705/30
6,931,382 B2 *   8/2005   Laage .................. G06Q 20/382
                                                                    705/64
(Continued)

FOREIGN PATENT DOCUMENTS

CN    111033542 A   *   4/2020   ......... G06F 16/2365
JP    2002-24532 A       1/2002
(Continued)

OTHER PUBLICATIONS

Alex Hughes et al. "Beyond Bitcoin: What blockchain and distributed ledger technologies mean for firms." (Feb. 2019). Retrieved online Sep. 18, 2024. https://www.researchgate.net/publication/330972635_Beyond_Bitcoin_What_blockchain_and_distributed_ledger_technologies_mean_for_firms (Year: 2019).*
(Continued)

*Primary Examiner* — James A Reagan
(74) *Attorney, Agent, or Firm* — MATTINGLY & MALUR, PC

(57) ABSTRACT

A transaction has: lock release information; and a lock release condition. A first transaction has a record with a plurality of successive lock release conditions. A lock release condition of the first transaction includes public key information pertaining to an electronic signature different from the electronic signature of the issuer of the transaction. An asset/fund settlement device posts the first transaction in a ledger and determines executability of a second transaction issued after the first transaction by comparing, in accordance with the order of the plurality of successive lock release conditions, the lock release information and the lock release condition which have been posted in the ledger to lock release information and a lock release condition in a ledger of the second transaction. Thus, in a DvP transaction using electronic settlement, locked assets are safely returned, and (Continued)

deterioration in liquidity of assets/funds is avoided when the transaction is not established.

5 Claims, 39 Drawing Sheets

(56) References Cited

U.S. PATENT DOCUMENTS

| | | | | |
|---|---|---|---|---|
| 10,417,217 | B2* | 9/2019 | Pierce | H04L 9/50 |
| 10,614,446 | B2* | 4/2020 | Zarakas | G06K 19/0704 |
| 10,796,329 | B2* | 10/2020 | Arora | G06Q 30/0238 |
| 10,839,379 | B2* | 11/2020 | Pierce | G06Q 20/223 |
| 10,861,112 | B2* | 12/2020 | Forbes, Jr. | G06Q 30/0283 |
| 11,087,293 | B1* | 8/2021 | Yan | G06Q 20/389 |
| 11,315,138 | B1* | 4/2022 | Olson | G06Q 30/0233 |
| 11,477,654 | B1* | 10/2022 | Kahn | H04W 12/069 |
| 11,544,731 | B2* | 1/2023 | Arora | G06Q 30/0225 |
| 2002/0138445 | A1* | 9/2002 | Laage | G06Q 20/382 |
| | | | | 705/67 |
| 2017/0358041 | A1* | 12/2017 | Forbes, Jr. | G05D 3/12 |
| 2018/0039667 | A1* | 2/2018 | Pierce | H04L 9/3247 |
| 2018/0191503 | A1* | 7/2018 | Alwar | H04L 9/3242 |
| 2019/0028276 | A1* | 1/2019 | Pierce | G06Q 20/3825 |
| 2019/0095879 | A1* | 3/2019 | Eyal | G06Q 20/223 |
| 2019/0114706 | A1* | 4/2019 | Bell | G06Q 40/03 |
| 2020/0027077 | A1* | 1/2020 | Zarakas | G06K 19/0704 |
| 2020/0167775 | A1* | 5/2020 | Reese | G06Q 20/38215 |
| 2020/0311816 | A1* | 10/2020 | Calvin | H04L 9/50 |
| 2021/0073804 | A1* | 3/2021 | Kikinis | G06Q 20/3276 |
| 2021/0287285 | A1* | 9/2021 | Yan | H04L 9/3239 |
| 2021/0383334 | A1* | 12/2021 | Krasnyansky | G06Q 20/02 |
| 2022/0051235 | A1 | 2/2022 | Ohashi et al. | |
| 2024/0121613 | A1* | 4/2024 | Kahn | H04W 12/08 |

FOREIGN PATENT DOCUMENTS

| | | | | |
|---|---|---|---|---|
| JP | 2019528590 | A * | 10/2019 | G06F 16/2365 |
| JP | 2020-47104 | A | 3/2020 | |
| JP | 2020-67806 | A | 4/2020 | |
| JP | 2020-123265 | A | 8/2020 | |
| WO | 2019/104250 | A1 | 5/2019 | |
| WO | WO-2019235198 | A1 * | 12/2019 | G06Q 20/02 |

OTHER PUBLICATIONS

Information and Communication Technology Division. "National Blockchain Strategy: Bangladesh." (Mar. 2020). Retrieved online Sep. 18, 2024. https://bcc.portal.gov.bd/sites/default/files/files/bcc.portal.gov.bd/page/bdb0a706_e674_4a40_a8a8_7cfccf7e9d9b/2020-10-19-15-03-391a6d9d1eb062836b440256cee3493 (Year: 2020).*
Martin Kleppmann. "How to do distributed locking." (Feb. 8, 2016). Retrieved online Sep. 18, 2024. https://martin.kleppmann.com/2016/02/08/how-to-do-distributed-locking.html (Year: 2016).*
TierNolan, Bitcoin Forum > Bitcoin > Development & Technical Discussion > Alt chains and atomic transfers, Jul. 18, 2020 (online), searched on Jul. 18, Reiwa 02, Internet <URL:https://bitcointalk.org/index.php?topic=193281.0>.
Stella, "Securities settlement systems: delivery-versus-payment in a distributed ledger environment" A joint research project of European Central Bank and the Bank of Japan, Mar. 2018., <URL:https://www.boj.or.jp/announcements/release_2018/data/rel180327a1.pdf, https://www.boj.or.jp/announcements/release_2018/data/rel180327a3.pdf, https://www.boj.or.jp/announcements/release_2018/data/rel180327a2.pdf, https://www.boj.or.jp/announcements/release_2018/data/rel180327a4.pdf>.
International Search Report of PCT/JP2021/027808 dated Nov. 2, 2021.
1 Indian Office Action received in corresponding Indian Application No. 202347011922 dated Jan. 28, 2025.

* cited by examiner

FIG. 4

Ledger (Assets/Funds L)

| Asset / Fund ID | Balance | # | # | Public Key | Unlock Condition | | |
|---|---|---|---|---|---|---|---|
| | | | | | Hash | Time | |
| L0001 | 50 | 1 | - | A0123 | — | — | |
| | | 1 | - | B0987 | 3a4b5c6d | — | |
| | | 2 | - | A0123 | — | 2020/03/15 12:00 | |
| L0801 | 300 | 3 | - | B0987 | 4c5d6e8f | — | |
| | | 3 | 1 | A0123 | 5b6c7d8e | — | |
| | | 3 | 2 | A0123 | — | 2020/03/15 12:00 | |
| ⋮ | ⋮ | ⋮ | ⋮ | ⋮ | ⋮ | ⋮ | |

FIG. 5

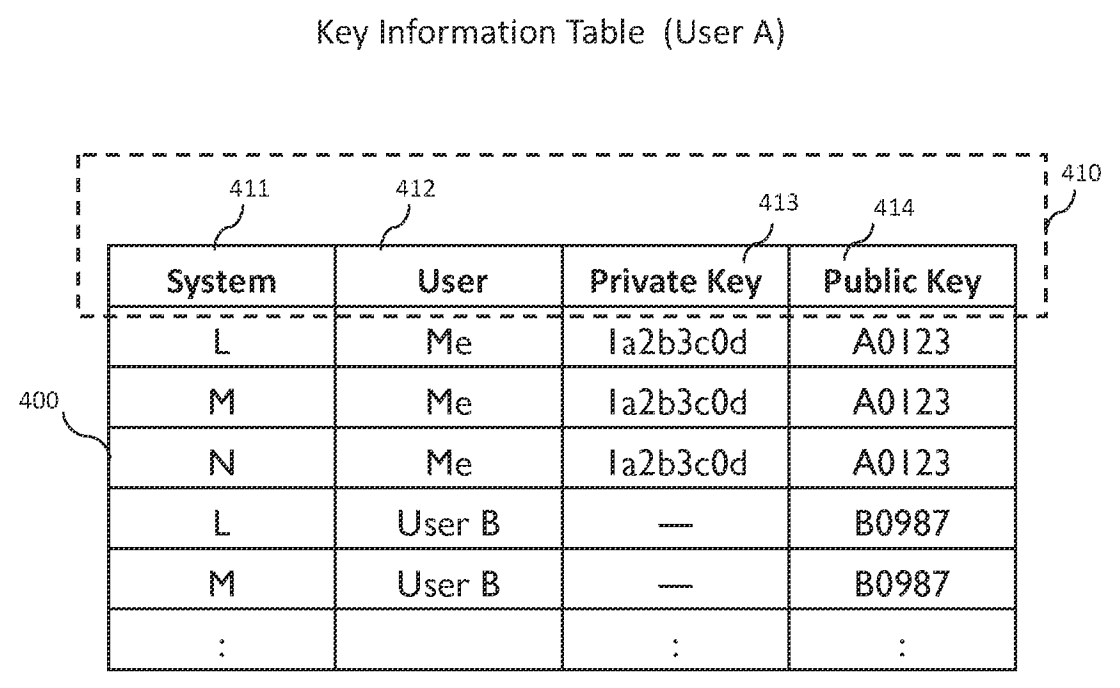

Key Information Table (User A)

| System | User | Private Key | Public Key |
|---|---|---|---|
| L | Me | 1a2b3c0d | A0123 |
| M | Me | 1a2b3c0d | A0123 |
| N | Me | 1a2b3c0d | A0123 |
| L | User B | — | B0987 |
| M | User B | — | B0987 |
| .. | | .. | .. |

FIG. 6

Initial Transaction Template 700

700A

| Transaction Identification | Asset/Fund ID | Amount | Unlock Information ||| Unlock Condition |||||
|---|---|---|---|---|---|---|---|---|---|---|
| | | | Electronic Signature | secret Information | | # | # | Public Key | Hash | Time |
| | | | | | | 1 | - | [Pb] | [y1] | — |
| | | | | | | 2 | - | [Pa] | — | [T1] |
| | | | | | | 3 | - | [Pb] | [y2] | — |
| | | | | | | 3 | 1 | [Pa] | [y3] | — |
| | | | | | | 3 | 2 | [Pa] | — | [T1] |

700B

| Transaction Identification | Asset/Fund ID | Amount | Unlock Information ||| Unlock Condition |||||
|---|---|---|---|---|---|---|---|---|---|---|
| | | | Electronic Signature | secret Information | | # | # | Public Key | Hash | Time |
| | | | | | | 1 | - | [Pa] | [y1] | — |
| | | | | | | 2 | - | [Pb] | — | [T1-T2] |
| | | | | | | 3 | - | [Pa] | [y2] | — |
| | | | | | | 3 | 1 | [Pb] | [y3] | — |
| | | | | | | 3 | 2 | [Pb] | — | [T1-T2] |

FIG. 7

Initial transaction execution result template 800

800A

| Asset/Fund ID | Balance | # | # | Unlock Condition ||||
|---|---|---|---|---|---|---|---|
| | | | | Public Key | Hash | Time |
| * | * | 1 | - | $[P_b]$ | $[y1]$ | — |
| | | 2 | - | $[P_a]$ | — | $[T1]$ |
| | | 3 | - | $[P_b]$ | $[y2]$ | — |
| | | 3 | 1 | $[P_a]$ | $[y3]$ | — |
| | | 3 | 2 | $[P_a]$ | — | $[T1]$ |

821 822 824 825 823 826 827 820

800B

| Asset/Fund ID | Balance | # | # | Unlock Condition ||||
|---|---|---|---|---|---|---|---|
| | | | | Public Key | Hash | Time |
| * | * | 1 | - | $[P_a]$ | $[y1]$ | — |
| | | 2 | - | $[P_b]$ | — | $[T1-T2]$ |
| | | 3 | - | $[P_a]$ | $[y2]$ | — |
| | | 3 | 1 | $[P_b]$ | $[y3]$ | — |
| | | 3 | 2 | $[P_b]$ | — | $[T1-T2]$ |

FIG. 8A

Parameter Template 900

| Funds / Assets | | Variable Name | Category | Acquisition Means | Value | |
|---|---|---|---|---|---|---|
| Assets / Funds 1 | Assets / Funds 2 | | | | Assets / Funds 1 | Assets / Funds 2 |
| | | $P_a$ | public key | reference | | |
| | | $P_b$ | public key | reference | | |
| | | $x_1$ | secret information | create | | |
| | | $y_1$ | hash value | create | | |
| | | $x_2$ | secret information | create | | |
| | | $y_2$ | hash value | create | | |
| | | $x_3$ | secret information | create | | |
| | | $y_3$ | hash value | create | | |
| | | $T_1$ | time | create | | |

FIG. 8B

| Funds / Assets | | Variable Name | Category | Acquisition Means | Value | |
|---|---|---|---|---|---|---|
| Assets / Funds 1 | Assets / Funds 2 | | | | Assets / Funds 1 | Assets / Funds 2 |
| | | $P_a$ | public key | reference | | |
| | | $P_b$ | public key | reference | | |
| | | $x_1$ | secret information | reference | | |
| | | $y_1$ | hash value | reference | | |
| | | $x_2$ | secret information | reference | | |
| | | $y_2$ | hash value | reference | | |
| | | $x_3$ | secret information | reference | | |
| | | $y_3$ | hash value | reference | | |
| | | $T_1$ | time | reference | | |
| | | $T_2$ | time | create | | |

Transaction Status Management Information Template 1000

| Funds/Assets | # | # | Urgent Flag | Category |
|---|---|---|---|---|
| | 2 | - | ● | unsuccessful |
| | 3 | 1 | - | unsuccessful |
| | 3 | 2 | ● | unsuccessful |
| | 1 | - | ● | successful |
| | 3 | - | - | unsuccessful |

1000A

| Funds/Assets | # | # | Urgent Flag | Category |
|---|---|---|---|---|
| | 1 | - | ● | successful |
| | 3 | - | - | unsuccessful |
| | 2 | - | ● | unsuccessful |
| | 3 | 1 | - | unsuccessful |
| | 3 | 2 | ● | unsuccessful |

1000B

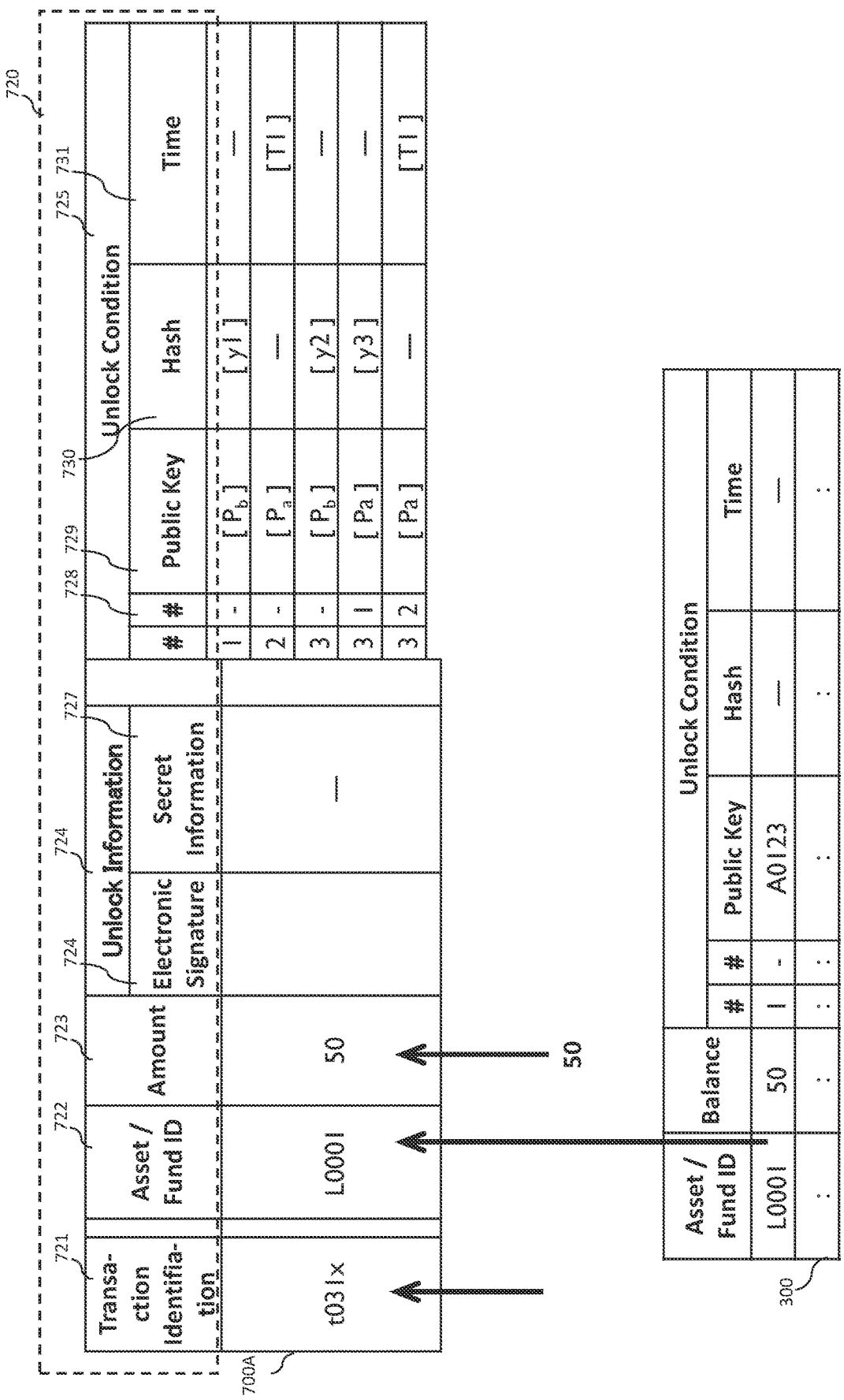

FIG. 17

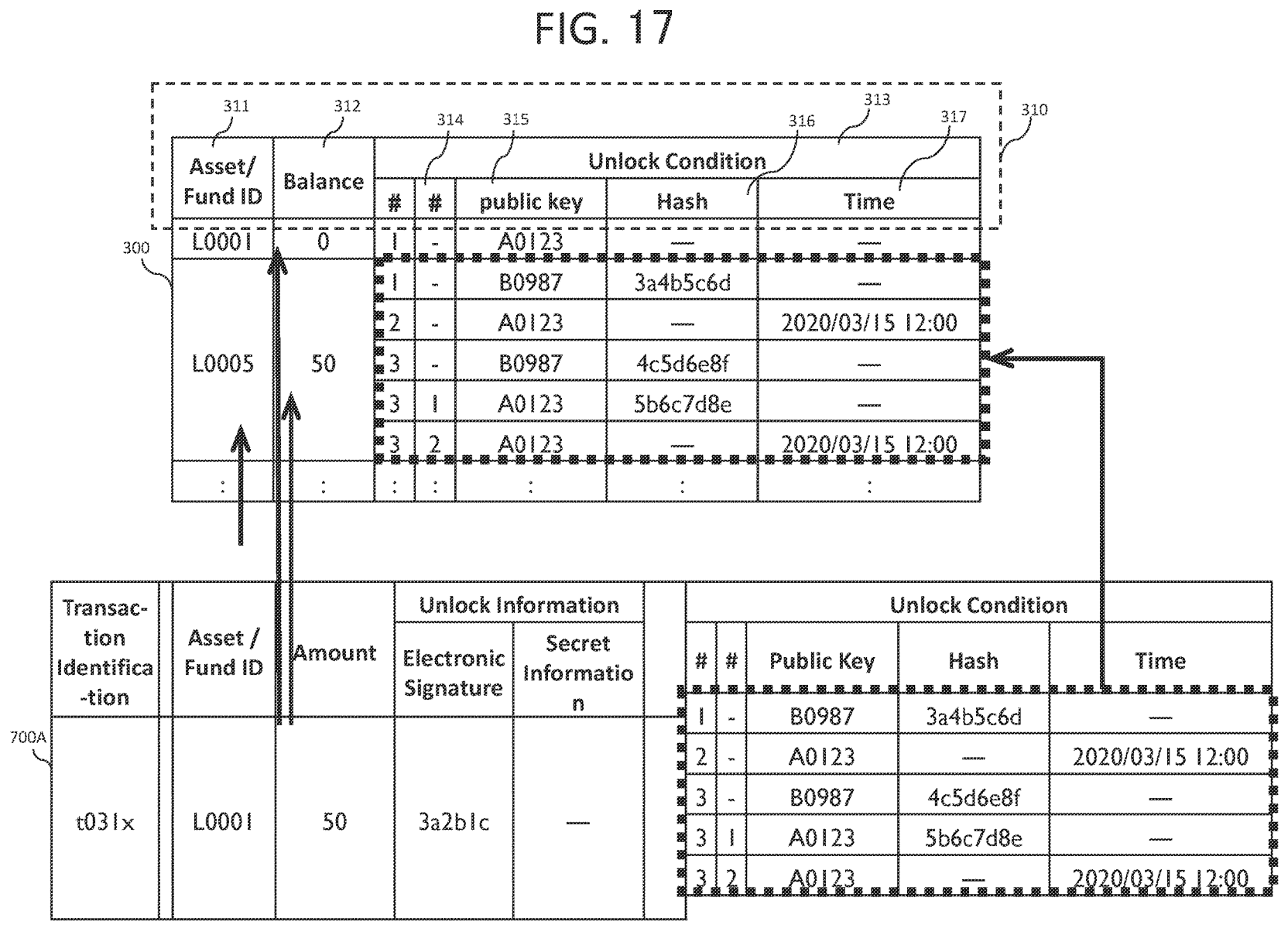

| Asset/Fund ID | Balance | Unlock Condition | | | |
|---|---|---|---|---|---|
| | | # | # | public key | Hash | Time |
| L0001 | 0 | 1 | - | A0123 | — | — |
| L0005 | 50 | 2 | - | B0987 | 3a4b5c6d | 2020/03/15 12:00 |
| | | 3 | 1 | B0987 | 4c5d6e8f | — |
| | | 3 | 1 | A0123 | 5b6c7d8e | — |
| | | 3 | 2 | A0123 | — | 2020/03/15 12:00 |
| ... | | ... | | | | |

| Transaction Identification | Asset/Fund ID | Amount | Unlock Information | |
|---|---|---|---|---|
| | | | Electronic Signature | Secret Information |
| t031x | L0001 | 50 | 3a2b1c | — |

Unlock Condition

| # | # | Public Key | Hash | Time |
|---|---|---|---|---|
| 1 | - | B0987 | 3a4b5c6d | 2020/03/15 12:00 |
| 2 | - | A0123 | — | — |
| 3 | 1 | B0987 | 4c5d6e8f | — |
| 3 | 1 | A0123 | 5b6c7d8e | — |
| 3 | 2 | A0123 | — | 2020/03/15 12:00 |

FIG. 18

| Funds / Assets | # | # | Urgent Flag | Category |
|---|---|---|---|---|
| L | L0005 | 2 | - | • | unsuccessful |
|  |  | 3 | 1 | • | unsuccessful |
|  |  | 3 | 2 | • | unsuccessful |
|  |  | 1 | - | - | successful |
| M |  | 3 | - | - | unsuccessful |

1000A

| Funds / Assets | | Variable Name |
|---|---|---|
| Assets / Funds 1 | Assets / Funds 2 | $P_a$, $P_b$, $x_1$, $y_1$, $x_2$, $y_2$, $x_3$, $y_3$, $T_j$ |
| L  L0005 | M | |

Figure 23:
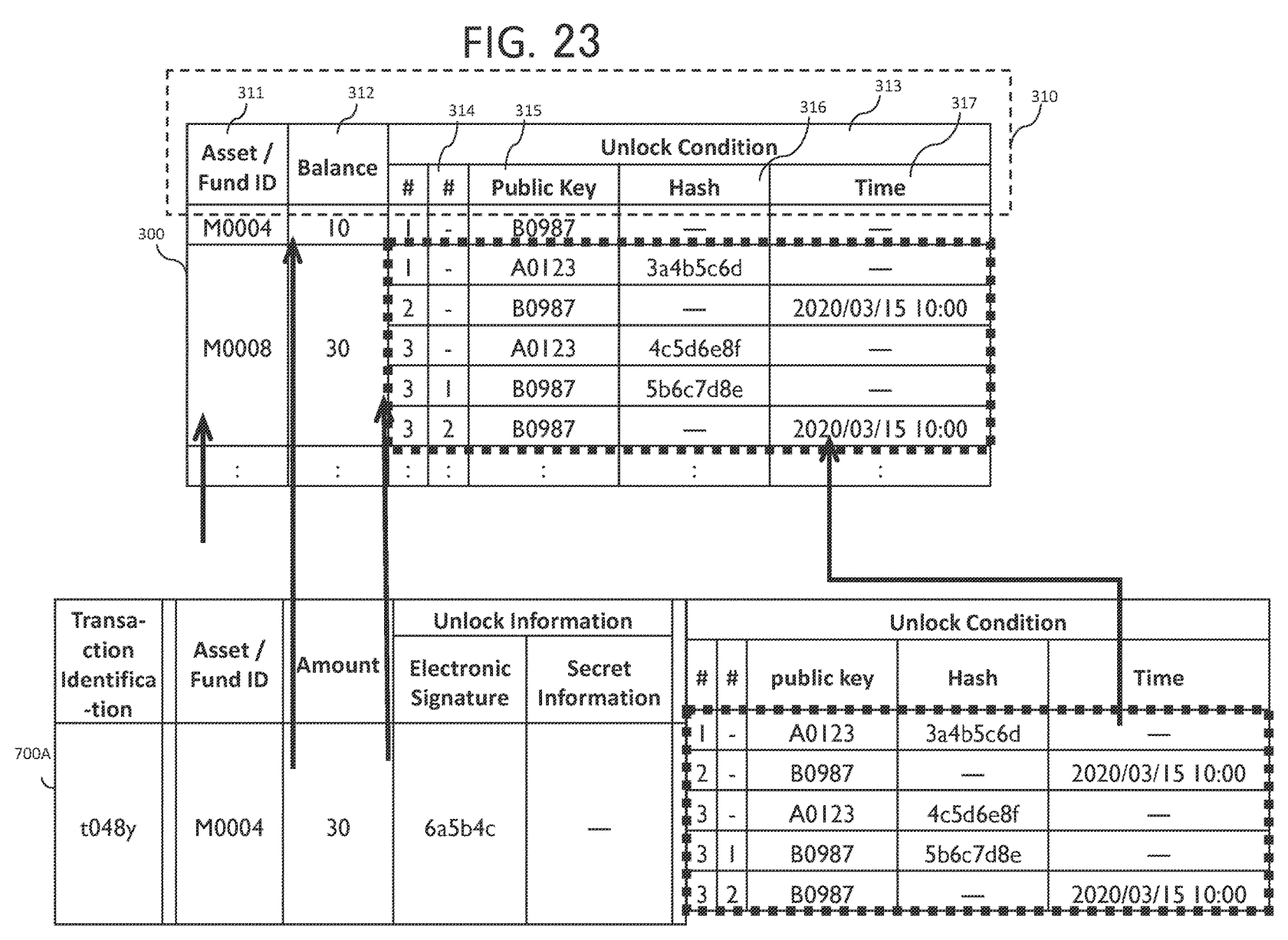

| Asset / Fund ID | Balance | Unlock Condition | | | |
|---|---|---|---|---|---|
| | | # | Public Key | Hash | Time |
| M0004 | 10 | 1 | B0987 | — | — |
| M0008 | 30 | 2 | A0123 | 3a4b5c6d | — |
| | | 3 | B0987 | 4c5d6e8f | — |
| | | 3 | A0123 | — | 2020/03/15 10:00 |
| | | 3 | B0987 | 5b6c7d8e | 2020/03/15 10:00 |
| ⋮ | ⋮ | ⋮ | B0987 | ⋮ | ⋮ |

| Transaction Identification | Asset / Fund ID | Amount | Unlock Information | | Unlock Condition | | |
|---|---|---|---|---|---|---|---|
| | | | Electronic Signature | Secret Information | # | public key | Hash | Time |
| t048y | M0004 | 30 | 6a5b4c | — | 1 | A0123 | 3a4b5c6d | — |
| | | | | | 2 | B0987 | — | — |
| | | | | | 3 | A0123 | 4c5d6e8f | — |
| | | | | | 3 | B0987 | — | 2020/03/15 10:00 |
| | | | | | 3 | B0987 | 5b6c7d8e | 2020/03/15 10:00 |

F I G. 25B

| Funds / Assets | | # | # | Urgent Flag | Category |
|---|---|---|---|---|---|
| L | L0005 | 2 | - | ● | unsuccessful |
| | | 3 | 1 | | unsuccessful |
| M | M0008 | 3 | 2 | ● | unsuccessful |
| | | 1 | - | ● | successful |
| | | 3 | - | - | unsuccessful |

1000A

| Funds / Assets | | Variable name |
|---|---|---|
| Assets / Funds 1 | Assets / Funds 2 | |
| | | $P_a$ |
| | | $P_b$ |
| L L0005 | M M0008 | $x_1$ |
| | | $y_1$ |
| | | $x_2$ |
| | | $y_2$ |
| | | $x_3$ |
| | | $y_3$ |
| | | $T_1$ |

| Funds / Assets 1021 | | # # 1022 | | Urgent Flag 1023 | Category 1024 |
|---|---|---|---|---|---|
| L | L0005 | 1 | - | ● | successful |
| | | 3 | - | - | unsuccessful |
| M | M0008 | 2 | - | ● | unsuccessful |
| | | 3 | 1 | - | unsuccessful |
| | | 3 | 2 | ● | unsuccessful |

1020

1000B

ELECTRONIC PAYMENT SYSTEM AND ELECTRONIC PAYMENT METHOD

TECHNICAL FIELD

The present invention relates to an electronic payment system and an electronic payment method, and in particular, relates a technology for preventing from decreasing the liquidity of assets/funds while ensuring the safety of the transactions when depositing the assets/funds and conducting electronic payment transactions.

BACKGROUND ART

With the progress of information processing technology, electronic commerce, in which securities such as stocks are traded through a system composed of information processing devices such as servers and network lines connecting them, has become popular.

As an example of such electronic commerce, Non-Patent Document 1 describes a mechanism for realizing HTLC (Hashed Timelock Contract) in DvP (Delivery Versus Payment) transactions. This non-patent document 1 describes an atomic assets/funds exchange method that utilizes secret information, a hash function, and a mechanism such as a timeout.

Here, a DvP transaction is a method of payment transaction that does not cause a misunderstanding between the two parties even if payment default occurs, in the way that the transaction links the transfer of securities and funds, and delivers the securities on the condition that the payment is made, conversely, makes a payment on the condition that the securities are delivered.

Moreover, HTLC relates to the transaction mechanism allowing each asset in the escrow area to be withdrawn back to its original holder in the way that first a trader's assets/funds are moved to an area for escrow (escrow), and it will time out after a period without the assets being moved.

In addition, Non-Patent Document 2 points out such problems of HTLC.

PRIOR ART DOCUMENTS

Non-Patent Literature

[Non-Patent Document 1] TierNolan, Bitcoin Forum>Bitcoin>Development & Technical Discussion>Alt chains and atomic transfers, [online], Jul. 18, 2020, [searched on July 18, Reiwa 02], Internet <URL:https://bitcointalk.org/index.php-?topic=193281.0>

[Non-Patent Document 2] Bank of Japan, European Central Bank, "Project Stella: Joint Research Report on Distributed Ledger Technology by Bank of Japan and European Central Bank (Second Phase)", Mar. 27, 2018, [Reiwa Searched on July 18, Reiwa 02], Internet <URL:https://www.boj.or.jp/announcements/release_2018/data/rel180327a1.pdf,
https://www.boj.or.jp/announcements/release_2018/data/rel180327a3.pdf,
https://www.boj.or.jp/announcements/release_2018/data/rel180327a2.pdf,
https://www.boj.or.jp/announcements/release_2018/data/rel180327a4.pdf>

SUMMARY OF INVENTION

Technical Problem

Non-Patent Document 1 above describes a mechanism of HTLC that realizes DvP transactions across multiple asset/fund settlement devices without an intermediary.

However, the technology described in Non-Patent Literature 1 has a problem of a decrease in liquidity of assets/funds when a transaction fails. Regarding this point, in Non-Patent Document 2, "From the viewpoint of liquidity utilization, the multi-ledger HTLC method tends to be less efficient than the single-ledger method. Especially, if the payment is not completed regardless of locking assets, and the assets are returned to the original owner after the timeout period has passed, this tendency becomes stronger."

An object of the present invention is to provide an electronic payment system and an electronic payment method to enable safe withdrawal of locked assets despite time-out or not in DvP transactions using electronic settlement in which a trader deposits assets, and to enable avoiding a decrease in the liquidity of assets/funds when a transaction fails, thereby ensuring the safety of the transaction.

Solution to Problem

The configuration of the electronic payment system of the present invention preferably as follows:

An electronic payment system comprising a transaction issuing device for issuing transactions relating to assets/funds and an asset/fund settlement device connected to said transaction issuing device via a network and configured to settle assets/funds based on transactions issued by said transaction issuing device, the transaction has a quantity of assets/funds, unlock information including the electronic signature of a transaction issuer, and unlock conditions including a trader's public key, a first transaction consists of records holding multiple consecutive unlock conditions, the unlock condition for said first transaction includes public key information related to an electronic signature different from that of said transaction issuer, said asset/fund settlement device posts said first transaction issued by said transaction issuing device to the ledger, determines whether or not the second transaction issued after said first transaction can be executed by means of collating the lock release information and lock release condition posted to said ledger with the lock release information and lock release condition posted to said ledger, according to the order of the plurality of consecutive lock release conditions of said first transaction, and executes said second transaction determined to be executable.

Advantageous Effects of Invention

According to the present invention, we are able to provide an electronic payment system and an electronic payment method to enable safe withdrawal of locked assets despite time-out or not in DvP transactions using electronic settlement in which a trader deposits assets, and to enable avoiding a decrease in the liquidity of assets/funds when a transaction fails, thereby ensuring the safety of the transaction.

BRIEF DESCRIPTION OF DRAWINGS

FIG. 4 is the figure which shows one example of a ledger.

FIG. 5 is the figure which shows one example of a key information table.

FIG. 6 is a figure which shows one example of an initial transaction template.

FIG. 7 is a figure which shows one example of initial transaction execution result template.

FIG. 8A is a figure which shows one example of a parameter template (No. 1).

FIG. 8B is a figure which shows one example of a parameter template (No. 2).

FIG. 9 is a figure which shows one example of transaction situation management information template.

FIG. 15A is a diagram which shows one example of a first initial transaction creation process (No. 1).

FIG. 17 is a figure which shows one example of execution processing of the first initial transaction.

FIG. 18 is a figure which shows one example of the processing which confirms the execution result of the first initial transaction.

FIG. 23 illustrates one example of execution processing of a second initial transaction.

FIG. 25B is a diagram which shows one example of processing for verifying the execution result of the second initial transaction (No. 2).

FIG. 27 is a diagram which shows one example of a user selecting a transaction.

DESCRIPTION OF EMBODIMENTS

An embodiment according to the present invention will be described below with reference to FIGS. 1 to 33.

Figure 1:
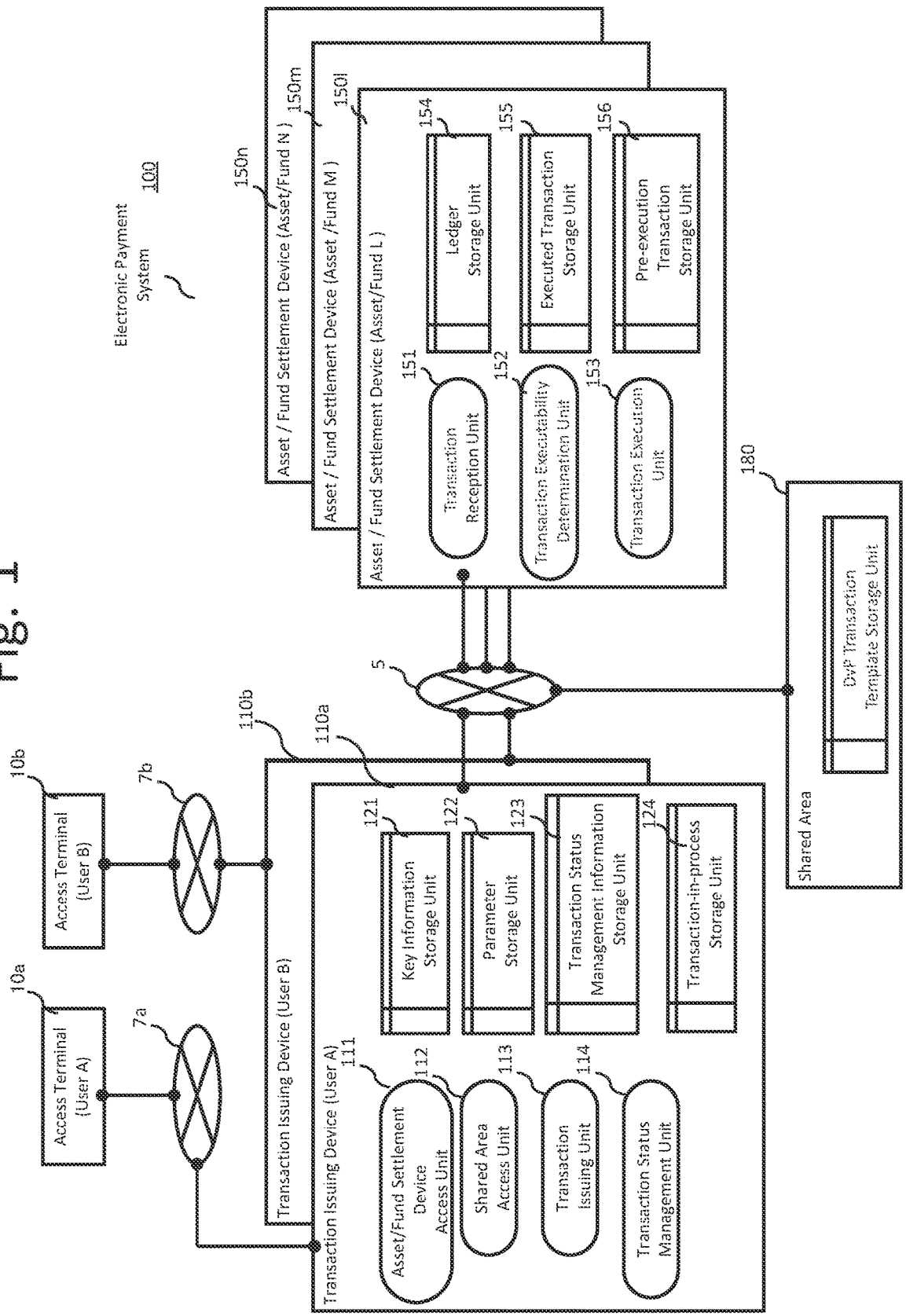
FIG. 1 is an overall configuration diagram of an electronic payment system.

First, the configuration of an electronic payment system according to an embodiment will be described with reference to FIGS. 1 to 3.

The electronic payment system 100 of the present embodiment is based on distributed ledger technology (DLT). In distributed ledger technology, trading participants (traders) in the market assume transactions and ledgers based on a common trading model, issue transactions, reflect the transactions on the ledger on the system side, and the transaction proceeds by judging the success or failure of the issued transaction.

In the present embodiment, we explain one example of the model such that user A and user B participate as traders, user A provides stock, and in return receives currency "yen" from user B (user B purchases stock from user A by currency "yen").

The electronic payment system 100 includes two or more transaction issuing devices 110 (in FIG. 1, two transaction issuing devices are denoted by 110A and 110B, respectively), two or more asset/fund settlement devices 150 (in FIG. 1 has three asset/fund settlement devices, and has a shared area 180, denoted by 150L, 150M, and 150N for the assets/funds L, assets/funds M, and assets/funds N to be handled, respectively), and they are connected by a network 5 respectively. The network 5 may be a LAN (Local Area Network) or a global network such as the Internet.

The transaction issuing device 110 is an information processing device that issues a transaction as a transaction unit. Transaction issuing devices 110A and 110B are connected by networks 7A and 7B, respectively, so that they can be operated only from access terminals 10A and 10B of users A and B, respectively. Each of the transaction issuing devices 110A and 110B is connected by the network 5 so as to exchange data with a plurality of asset/fund settlement devices 150, respectively. Each of the transaction issuing devices 110A and 110B is connected to the shared area 180 so as to exchange data. The shared area 180 is an area provided by a file server or a database server that can be accessed in common by the transaction issuing devices 110A and 110B (not shown), and has a DvP transaction template storage unit 181.

The transaction issuing device 110 has a key information storage unit 121, a parameter storage unit 122, a transaction status management information storage unit 123, and a transaction-in-process storage unit 124 as storage units for storing respective data, and processes the data respectively. As functional units, it has an asset/fund settlement device access unit 111, a shared area access unit 112, a transaction issuing unit 113, and a transaction status management unit 114.

The asset/fund settlement device access unit 111 is a functional unit that accesses the asset/fund settlement device 150 via the network 5. The shared area access unit 112 is a functional unit that accesses data in the shared area 180. The transaction issuing unit 113 is a functional unit that issues transactions related to deals. And, the transaction status management unit 114 is a functional unit that manages transactions and presents the information to the user.

The data structure handled by the transaction issuing device 110 will be detailed later.

The asset/fund settlement device 150 is a device that receives a transaction, posts the contents of the transaction to a ledger, proceeds with the transaction, and settles the settlement. In this embodiment, asset/fund settlement devices 150L, 160M, and 170N manage the holding balance of each user with respect to different assets/funds, asset/fund L, asset/fund M, and asset/fund N. Assets/funds here are securities such as stocks and government bonds, and units that bear the value of transactions such as currencies like "yen", "dollar" and "euro". Here, we explain each device has a different ledger of assets/funds, but one asset/fund settlement device 150 may handle a plurality of assets/funds.

The asset/fund settlement device 150 has a ledger storage unit 154, an executed transaction storage unit 155, and a pre-execution transaction storage unit 156 as storage units for storing respective data, and has a transaction reception unit 151, a transaction executability determination unit 152, and a transaction execution unit 153 as functional units which handle each data.

The transaction reception unit 151 is a functional unit that receives transactions issued by the transaction issuing device 110 via the network 5. The transaction executability determination unit 152 is a functional unit that determines whether the received transaction can be processed. The transaction execution unit 153 is a functional unit that executes a transaction that has been determined to be acceptable.

The data structure handled by the asset/fund settlement device 150 will be detailed later.

In the present embodiment, the explanation will be based on the scenario following: User A hands over assets/funds L (stocks) managed by asset/funds management system 150 to user b, and, as the consideration, user b hands over an asset/fund M (currency "yen") managed by asset/funds management system 160 to user A.

Next, the hardware/software configuration of the transaction issuing device and asset/fund settlement device will be described with reference to FIGS. 2 and 3.

Figure 2:
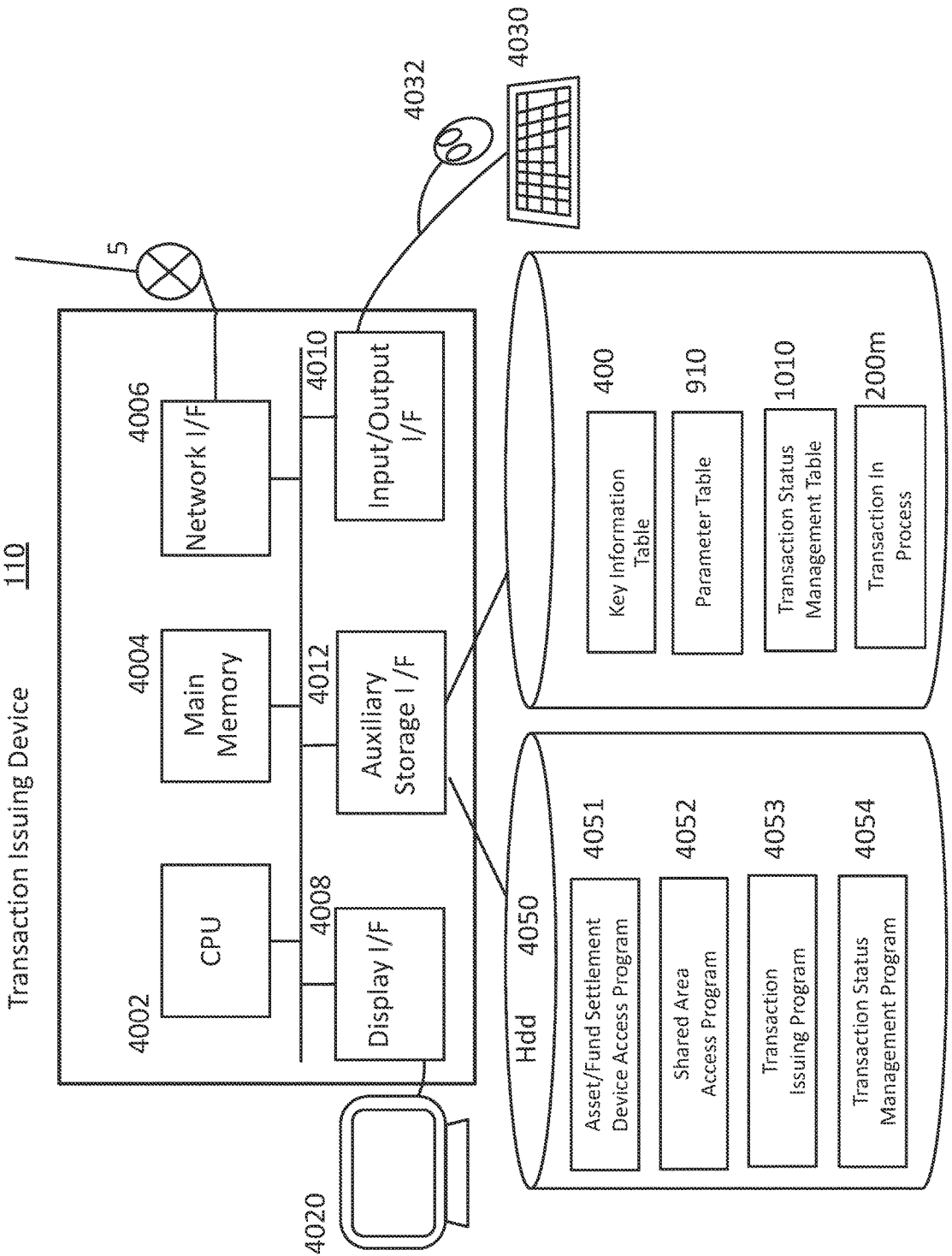
FIG. 2 is a hardware/software configuration diagram of a transaction issuing device.

As a hardware configuration of the transaction issuing device 110, for example, it is realized by a general information processing device such as a personal computer shown in FIG. 2

Transaction issuing device 110 includes a CPU (Central Processing Unit) 4002, a main storage device 4004, a network I/F (InterFace) 4006, a display I/F 4008, an input/output I/F 4010, and an auxiliary storage I/F 4012, which are coupled by a bus.

The CPU 4002 controls each part of the transaction issuing device 110, loads necessary programs into the main storage device 4004, and executes them.

The main memory device 4004 is normally composed of a volatile memory such as a RAM, and stores programs executed by the CPU 4002 and data to be referred to.

A network I/F 4006 is an interface for connecting with the network 5.

A display I/F 4008 is an interface for connecting a display device 4020 such as an LCD (Liquid Crystal Display).

The input/output I/F 4010 is an interface for connecting input/output devices. In the example of FIG. 2, a keyboard 4030 and a mouse 4032 as a pointing device are connected.

Auxiliary storage I/F 4012 is an interface for connecting auxiliary storage devices such as HDD (Hard Disk Drive) 4050 and SSD (Solid State Drive).

The HDD 4050 has a large storage capacity and stores programs for executing this embodiment. An access program 4051, a shared area access program 4052, a transaction issuance program 4053 and a transaction status management program 4054 are installed in the transaction issuing device 110.

Asset/fund settlement device access program 4051, shared area access program 4052, transaction issue program 4053, and transaction status management program 4054 are programs for implementing the functions of asset/fund settlement device access unit 111, shared area access unit 112, transaction issue unit 113, and transaction status management program 4054, respectively.

The HDD 4050 also stores a key information table 400, a parameter table 910, a transaction status management information table 1010, and a transaction in process 200M.

Figure 3:
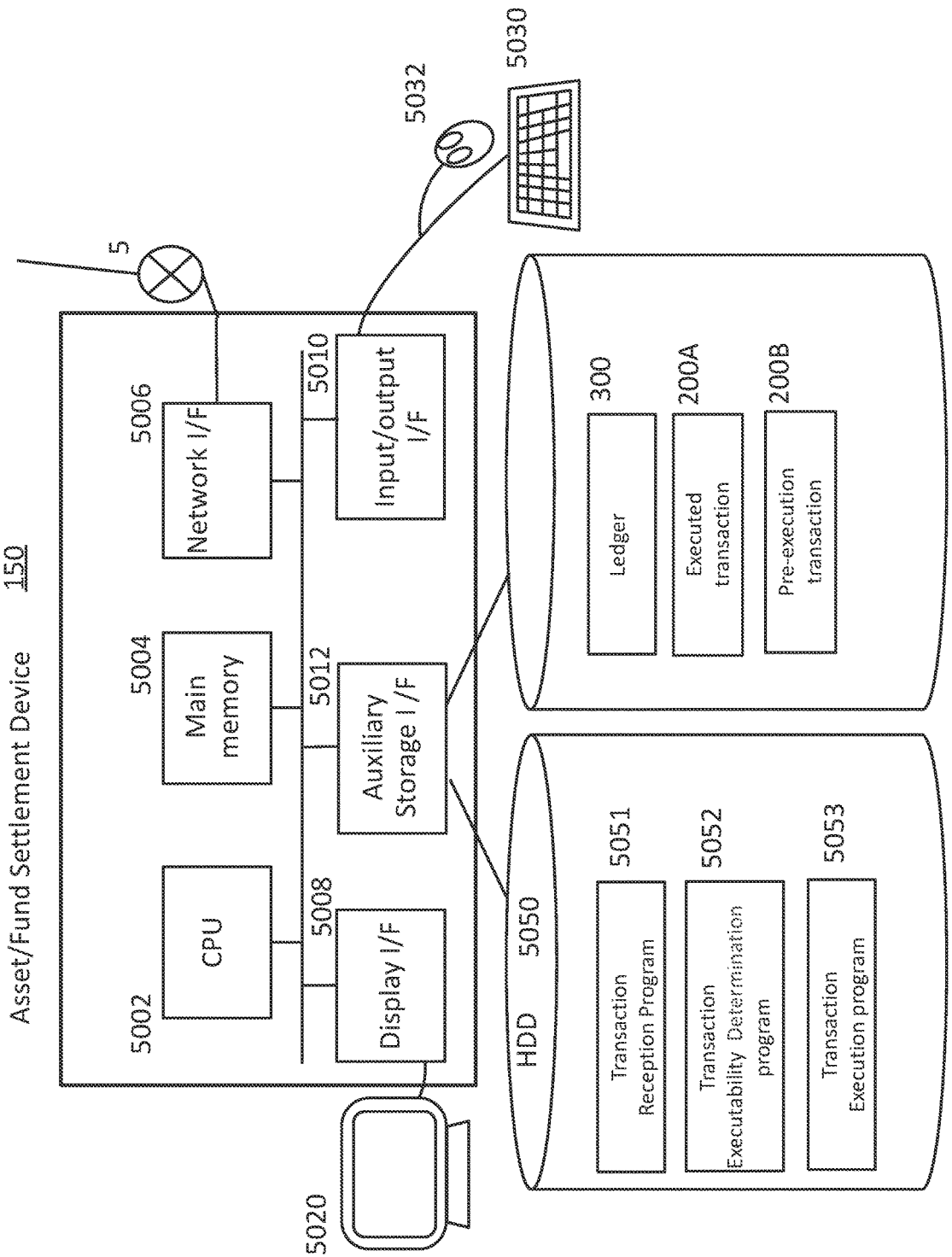
FIG. 3 is a hardware/software configuration diagram of an asset/fund settlement device.

As for the hardware configuration of the asset/fund settlement device 150, for example, it is realized by a general information processing device such as the server device shown in FIG. 3.

Each functional unit has the same function as each unit of the asset/fund settlement device shown in FIG. 2.

A transaction reception program 5051, a transaction executability determination program 5052, and a transaction execution program 5053 are installed in the HDD 5050 of the asset/fund settlement device 150.

A transaction reception program 5051, a transaction executability determination program 5052, and a transaction execution program 5053 are programs for implementing the functions of the transaction reception unit 151, the transaction executability determination unit 152, and the transaction execution unit 153, respectively.

The HDD 5050 of the asset/fund settlement device 150 also stores ledgers, executed transactions, and pre-executed transactions.

Next, the data structure in the electronic payment system of this embodiment will be described with reference to FIGS. 4 to 9.

First, an example of the ledger will be described with reference to FIG. 4.

The ledger 300 is data held by the asset/fund settlement device 150 in order to reflect transactions issued by the transaction issuing device 110 and to determine whether or not the transactions can be executed.

Ledger 300 (FIG. 4 is an example of asset/fund L) has asset/fund ID 311, balance 312, and lock release condition 313 as data attributes 310. The unlock condition 313 is composed of sub-attributes of item numbers 314, public key 315, hash value 316, and time 317. The ledger 300 also has one or more records, which are row-by-row information having data corresponding to each element of the data attribute 310.

Additionally, regarding the unlock condition 313, the data corresponding to the public key 315 means that "in order to transfer the asset of the record, the issued transaction requires an electronic signature corresponding to the described data". Moreover, the data corresponding to the hash value 316 means that "in order to transfer the asset of the record, the issued transaction requires secret information that will be input so that the output result of the hash function becomes the data described". And the data corresponding to the time 317 that "in order to transfer the asset of the record, the current time must be after the time indicated by the data described".

Furthermore, regarding the lock release condition 313, item numbers 314 indicate the applicable order of each condition. For example, in the example shown in FIG. 4, for a record whose asset/fund ID 311 is "L0801", it means that transactions corresponding to the lock release conditions must be executed in one of the following orders.

Condition of [1, -]
Conditions for [2, -]
After the condition of [3, -], the condition of [3, 1]
After the condition of [3, -], the condition of [3, 2]

Next, an example of the key information table will be explained using FIG. 5.

A key information table 400 (FIG. 5 is an example of user A) is a table that stores information on a user's private keys and public keys, and as shown in FIG. 5, has system 411, user 412, private key 413, and public key 414 as data attributes 410. In addition, the key information table 400 requires one or more records that are row-by-row information having data corresponding to the data attribute 410.

The system 411 stores the system name of the asset/fund settlement device. In the examples below, it is equated with the name of the asset/fund. The user 412 stores a user name. In this embodiment, the transaction users are "user A" and "user B". Private key 413 and public key 414 store private key data in public key technology and public key data corresponding to the private key, respectively. A private key is an encryption key known only to the user, and a public key is an encryption key that is allowed to be known by all parties involved in the transaction.

Note that a record whose user name 412 is "Me" means that the record relates to the information owner himself ("user A" for user A, "user B" for user B), and a valid value is stored as data corresponding to the private key 413. Also, a record in which the user name 412 is not "Me" means that the record is related to another company, and the data corresponding to the private key 413 is blank.

Next, an example of the initial transaction template will be described with reference to FIG. 6.

Initial transaction template 700 is a template for generating an initial transaction in the transaction issuing device, and is held in DvP transaction template storage section 181 of shared area 180. Here, the initial transaction is a template for posting the flow of transactions to the ledger, and when subsequent transactions are issued, they are matched with the posted ledger records, and when execution is possible, the transaction is executed, and the corresponding ledger record is deleted after execution (a specific example will be described later). In this embodiment, a transaction issued after the initial transaction is called a normal transaction.

Assume that the initial transaction template 700 of this embodiment includes a first initial transaction template 700A and a second initial transaction template 700B.

The first initial transaction template 700A has transaction ID 721, asset/fund ID 722, amount 723, unlock information 724, and unlock condition 725 as data attributes 720. Of these, the lock release information 724 is composed of sub-attributes of the electronic signature 726 and the secret information 727, and is data for clarifying the subject who issued the transaction. The unlock condition 725 is composed of sub-attributes of item numbers 728, public key 729, hash value 730 and time 731. Also, the first initial transaction template 700A has one or more records, which are row-by-row information having data corresponding to each element of the data attribute 720.

In the first initial transaction template 700A, data corresponding to unlock condition 725 has the same meaning as unlock condition 313 in ledger 300 shown in FIG. 4.

Moreover, although the data itself is different for the second initial transaction template 700B, each meaning is same as that of the first initial transaction template 700A.

Next, an example of the initial transaction execution result template will be described with reference to FIG. 7.

The initial transaction execution result template is a template for users participating in the transaction to verify the transaction pattern after the initial transaction is issued, and is held in the DvP transaction template storage unit 181 of the shared area 180.

Assume that the initial transaction execution result template 800 of this embodiment includes a first initial transaction execution result template 800A and a second initial transaction execution result template 800B.

The first transaction execution result template 800 A has asset/fund ID 821, balance 822, and unlock condition 823 as data attributes 820. Of these, the unlock condition 823 is composed of sub-attributes of item numbers 824, public key 825, hash value 826, and time 827. Also, the first transaction execution result template 800A has one or more records, which are row-by-row information having data corresponding to each element of the data attribute 820.

In the first initial transaction execution result template 800A, the data corresponding to the unlock condition 823 has the same meaning as the unlock condition 313 in the ledger 300 of FIG. 3.

Although the data itself is different for the second initial transaction template 800B, each meaning is same as that of the first initial transaction template 800A.

Next, parameter templates will be described with reference to FIGS. 8A and 8B.

Parameter template 900 is a template that holds information about parameters that are referenced by other templates, and is held in DvP transaction template storage unit 181 of shared area 180. In this embodiment, the data structure in which the values of the parameter template 900 are embedded is called a parameter table, and the values stored in the parameter table are called parameters.

We assume that as the parameter template 900 of this embodiment, there are two parameter templates, a first parameter template 900A and a second parameter template 900B.

The first parameter template 900A has assets/funds 921, variable name 922, category 923, acquisition means 924, and value 925 as data attributes 920. Of these, the assets/ funds 921 are composed of assets/funds 1: 920 and assets/funds 2: 921. Asset/Fund 1: 920 and Asset/Fund 2: 921 have sub-attributes of System 930 and Asset/Fund ID 931 respectively, as sub-attributes.

The variable name 922 stores the name of the variable when referred to as a template. The partition stores a category of variable such as "public key", "secret information", "hash value". Acquisition means 924 stores the method by which the system obtains the value.

The value 920 can also be divided into the sub-attributes Assets/Funds 1: 928 and Assets/Funds 2: 929 only for records whose category 923 is "public key". As to Assets/Funds 1: 928 and Assets/Funds 2: 929, each record is stored the value of the variable name in the columns correspond to the systems defined by Assets/Funds 1: 920 and Assets/Funds 2: 921, each system, and Asset/Funds ID, respectively.

Also, the first parameter template 900A has one or more records, which are row-by-row information having data corresponding to each element of the data attribute 920.

The data of the variable name 922 corresponds to the data of the lock release condition 725 of the initial transaction template 700 of FIG. 6 and the data of the lock release condition 823 of the initial transaction execution result template 800 of FIG. 7. In the present embodiment, the data of category 923 can be defined as four types of "public key", "secret information", "hash value", and "time". In this embodiment, the data of the acquisition means 924 can be defined as two types of "reference" and "creation".

Although the data itself is different for the second parameter template 900B, each meaning is same as that of the first parameter template 900A.

Next, the transaction status management information template will be described with reference to FIG. 9.

The transaction status management information template 1000 is a template for presenting possible transactions for the user from the system side, and is held in the DvP transaction template storage unit 181 of the shared area 180. The transaction status management information template 1000 is held in the transaction status management information storage unit 123 as a transaction status management information table.

The transaction status management information template 1000 of this embodiment comprises a first transaction status management information template 1000A and a second transaction status management information template 1000B.

The first transaction status management information template 1000A has assets/funds 1021, item numbers 1022, urgent flag 1023, and category 1024 as data attributes 1020, as shown in FIG. 9. Asset/Fund 1021 has System 1030 and Asset/Fund ID 1031 as sub-attributes.

In addition, the first transaction status management information template 1000A has one or more records, which are row-by-row information having data corresponding to each element of the data attribute 1020.

Furthermore, the data of item number 1022 corresponds to the data of item numbers 728 of the initial transaction template 700 in FIG. 6 or the data of item numbers 824 of the initial transaction execution result template 800 in FIG. 7. The category 1024 is a column for instructing the user about the result of the transaction, and in this embodiment, two types of "successful" and "unsuccessful" can appear.

It means that transactions for which the urgent flag 1023 is ON are transactions to be executed immediately by the system without the user selecting a transaction.

Although the data itself is different for the second transaction status management information template 1000B, each meaning is same as that of the first transaction status management information template 1000A.

We have explained various templates above, and then, in the Figures, the same reference numerals as the original templates are also used for the tables and transactions generated from the templates in order to make them easier to understand.

Next, an example of a transaction pattern in the electronic payment system of this embodiment will be described with reference to FIGS. 10 and 11.

Figure 10:
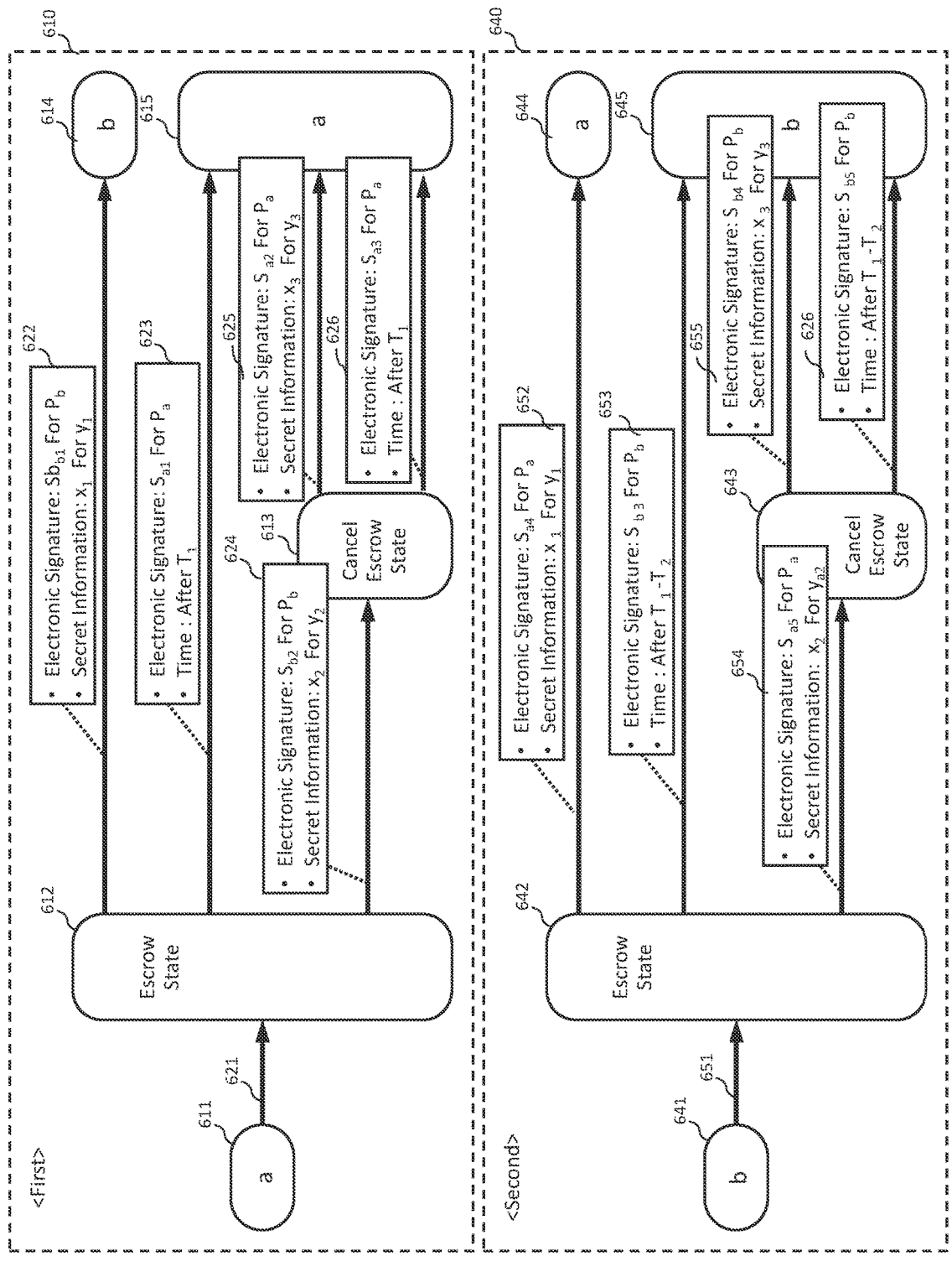
FIG. 10 is a figure which shows one example of the DvP transaction pattern when transaction is not concluded.

FIG. 10 shows the DvP transaction pattern when the transaction is not executed, and the DvP transaction pattern 600 at this time is represented by the first asset/fund transfer flow 610 and the second asset transfer flow 640. In this embodiment, the first asset/funds transfer flow represents the transaction flow corresponding to the asset/funds L. Also, the second asset/fund transfer flow represents the transaction flow corresponding to the asset/fund M.

The asset transfer flows 610 and 640 are represented in the form of directed graphs having states as nodes and edges represented by state transitions (transition conditions) connecting the nodes.

A state transition (transition condition) is represented by the unlock information and unlock condition of the initial transaction template 700 shown in FIG. 6.

The first asset transfer flow 610 has initial state 611, escrow state 612, cancel escrow state 613, end states 614 and 615 as states, and these nodes have state transitions (transition conditions) 621 to 626. Escrow state 612 means a state in which assets/funds L have been escrowed for trading. The cancel escrow state 613 means that the deposit is waiting for cancellation.

In the first asset transfer flow 610, it means that the escrow state 612 can transition to end states 614 and 615 when the conditions described in state transition (transition condition) 622 or state transition (transition condition) 623 are satisfied, and, it can transition to the cancel escrow state 613 when the conditions described in state transition (transition condition) 624 are satisfied. Further, it means that the intermediate state 613 can transition to the end state 615 when the conditions of the state transition (transition condition) 625 or the state transition (transition condition) 626 are satisfied.

The second asset transfer flow 640 also has the same meaning as the first asset transfer flow 610, although the data itself is different.

"·Electronic Signature: $S_{b1}$ for $P_b$, ·secret information: $x_1$ for $y_1$" described in the state transition (transition condition) 622 means that as transaction unlock information, the transaction having Electronic Signature $S_{b1}$ corresponding to public key $P_b$, and Secret Information $x_1$ with a hash value y1, is issued, thereby, the state is changed.

Here, "·Electronic Signature: $S_{a1}$ for Pa, ·Time: after $T_1$" described in the state transition (transition condition) 623 means that as transaction unlock information, the transaction having Electronic Signature $S_{a1}$ corresponding to public key $P_a$, is issued after Time $T_1$, thereby, the state is changed.

Further, the same is true for the transition regarding the cancel escrow state 613, but here, we note that regarding the state transition (transition condition) 624 as to the first asset transfer flow 610, the condition "·electronic signature: $S_{b2}$ for $P_b$, secret information: $x_2$ for $y_2$" is represented, and regarding the state transition (transition condition) 654 as to the second asset transfer flow 640, the condition "·electronic signature: $S_{a5}$ for $P_a$, ·secret information: $x_2$ for $y_2$" is represented.

These mean that when user A know the secret information $x_2$, the status of the transaction of asset/fund L is changed to the cancel escrow status (i.e., the transaction such that the transaction status of asset/fund L is canceled, is issued), and after user B learns the secret information $x_2$ disclosed by the transaction, user B can change the status of the transaction of asset/fund M as consideration to the cancel escrow status (that is, the transaction such that the transaction status of asset/fund M is canceled, is issued).

By defining the lock release information and the lock release conditions in such transactions, it is possible to prevent a negotiated transaction between users A and B from the occurrence of a situation in which only one of them bids the assets/funds in the negotiated transaction.

Concerning the style of processes, we assume that the DvP transaction pattern as shown in FIG. 10 is selected by user A's instruction based on the agreement result in S201, the first initial transaction template 700A in FIG. 6, the first parameter template 900A in FIG. 8A, and the first transaction status management information template 1000A in FIG. 9 are written as a transaction, a parameter table, and a transaction status management information table in the transaction-in-process storage section 124, parameter storage section 122, and transaction status management information storage section 123, respectively.

Also, in the first initial transaction template 600A, the value corresponding to the lock release condition 725 is the content corresponding to the state transition (transition condition) 622—state transition (transition condition) 626 in the first DvP transaction pattern in FIG. 10.

Figure 11:
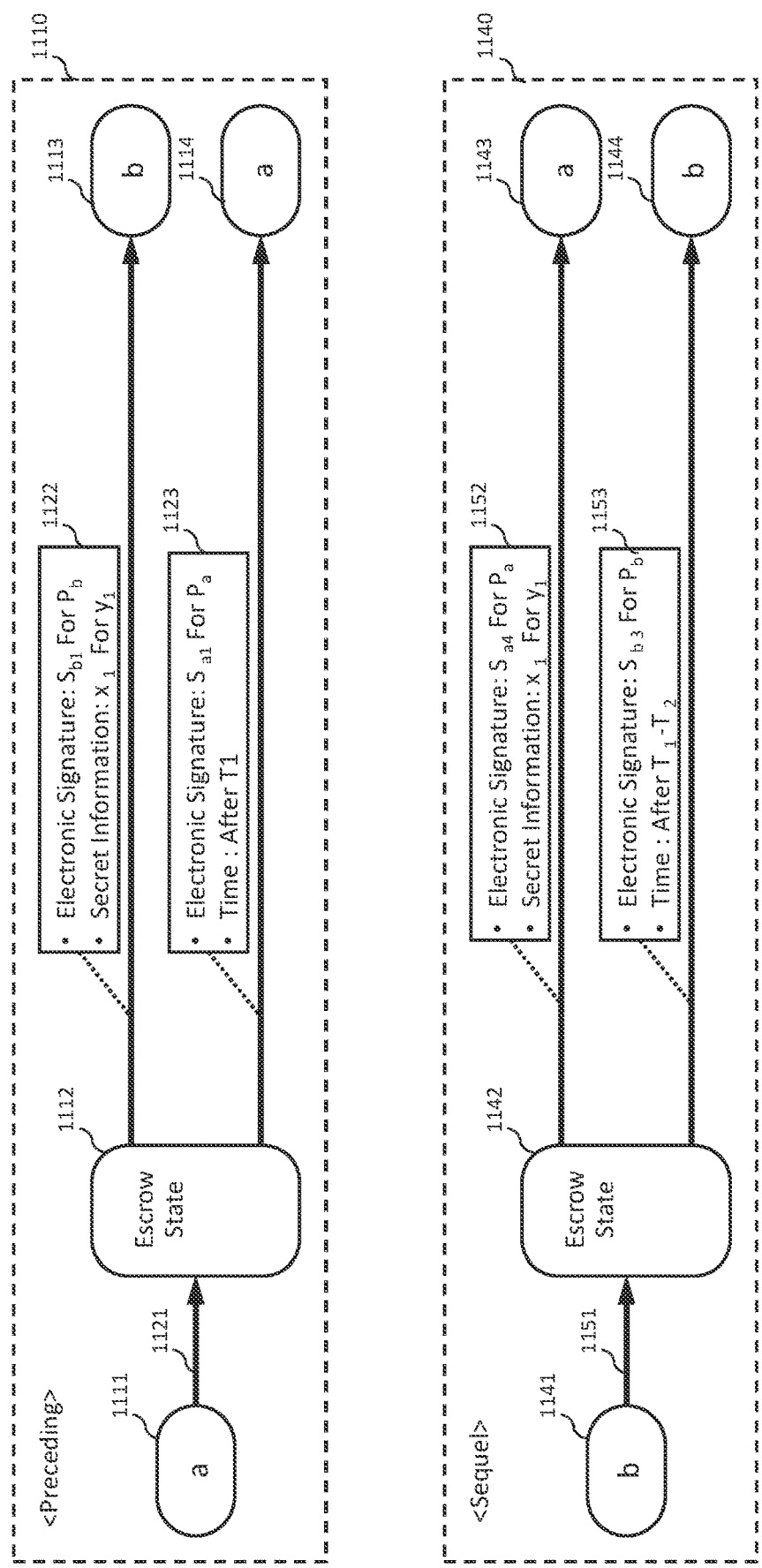
FIG. 11 is a figure which shows one example of the DvP transaction pattern when transaction is concluded.

FIG. 11 shows a DvP transaction pattern when a transaction is established, and the DvP transaction pattern 1100 at this time is represented as a first asset/fund transfer flow 1110 and a second asset transfer flow 1140. This is a DvP trading pattern for realizing normal HTLC trading. In this embodiment, the first asset/funds transfer flow represents the transaction flow corresponding to the asset/funds L. Also, the second asset/fund transfer flow represents the transaction flow corresponding to the asset/fund M.

In the first asset transfer flow 1110, it means that the escrow state 1112 can transition to the end states 1114 and 1115 when the conditions described in the state transition (transition condition) 1122 or state transition (transition condition) 1123 are satisfied.

The second asset transfer flow 640 also has the same meaning as the first asset transfer flow 1110, although the data itself is different.

Concerning the transition regarding the escrow state 1112, we note that the state transition (transition condition) 1122 regarding the first asset transfer flow 1110 is "·electronic signature: $S_{b1}$ for $P_b$, ·secret information: $x_1$ for $y_1$", the state transition (transition condition) 1152 relating to the second asset transfer flow 1140 is "·electronic signature: $S_{a4}$ for $P_a$, ·secret information: $x_1$ for $y_1$".

It means that when user A knows the secret information x1, the deposit state of the assets/funds L can be changed into the release state (i.e., a transaction to acquire the assets/funds L is issued), after user B learns the secret information $x_1$ disclosed by the transaction, user B can change the deposit status of assets/funds M as consideration to a canceled status (i.e., a transaction to acquire assets/funds M is issued).

By defining the lock release information and the lock release conditions in such transactions, it is possible to prevent a negotiated transaction between users A and B from the occurrence of a situation in which only one of them bids the assets/funds in the negotiated transaction.

Next, processing performed by the electronic payment system will be described with reference to FIGS. 12 to 33 based on the data structure, each template, and expected transaction patterns described above.

First, the first initial transaction execution processing in the electronic payment system will be described with reference to the necessary figures according to the flow of the flowchart of FIG. 12.

The first initial transaction is a transaction in which user A locks and secures assets/funds L to be handed over to user B, and sets processing conditions.

First, the parties to the transaction agree on the details of the transaction (S201). As a specific transaction content, they agree on the amount of assets to be transferred and the transaction procedure. This step of S201 is a process performed between user A and user B without going through the electronic payment system of the present embodiment.

In this embodiment, we assume that user A and user B confirm and agree that the amount of assets/funds L that user A gives to user B is "50", and the amount of assets/funds M that user B gives to user A as consideration is "30".

S202 to S206 are steps performed by user A via the transaction issuing device 110.

First, the transaction issuing device (user A) 110A selects assets/funds to be used for the first initial transaction (S202).

In this process, the transaction issuing unit 113 of the transaction issuing device (user A) 110A reads the ledger information of assets/funds L held by the asset/fund settlement device 150 via the asset/fund settlement device access unit 111. Further, based on user A's instruction, an asset regarding the first initial transaction is selected.

Figure 13:
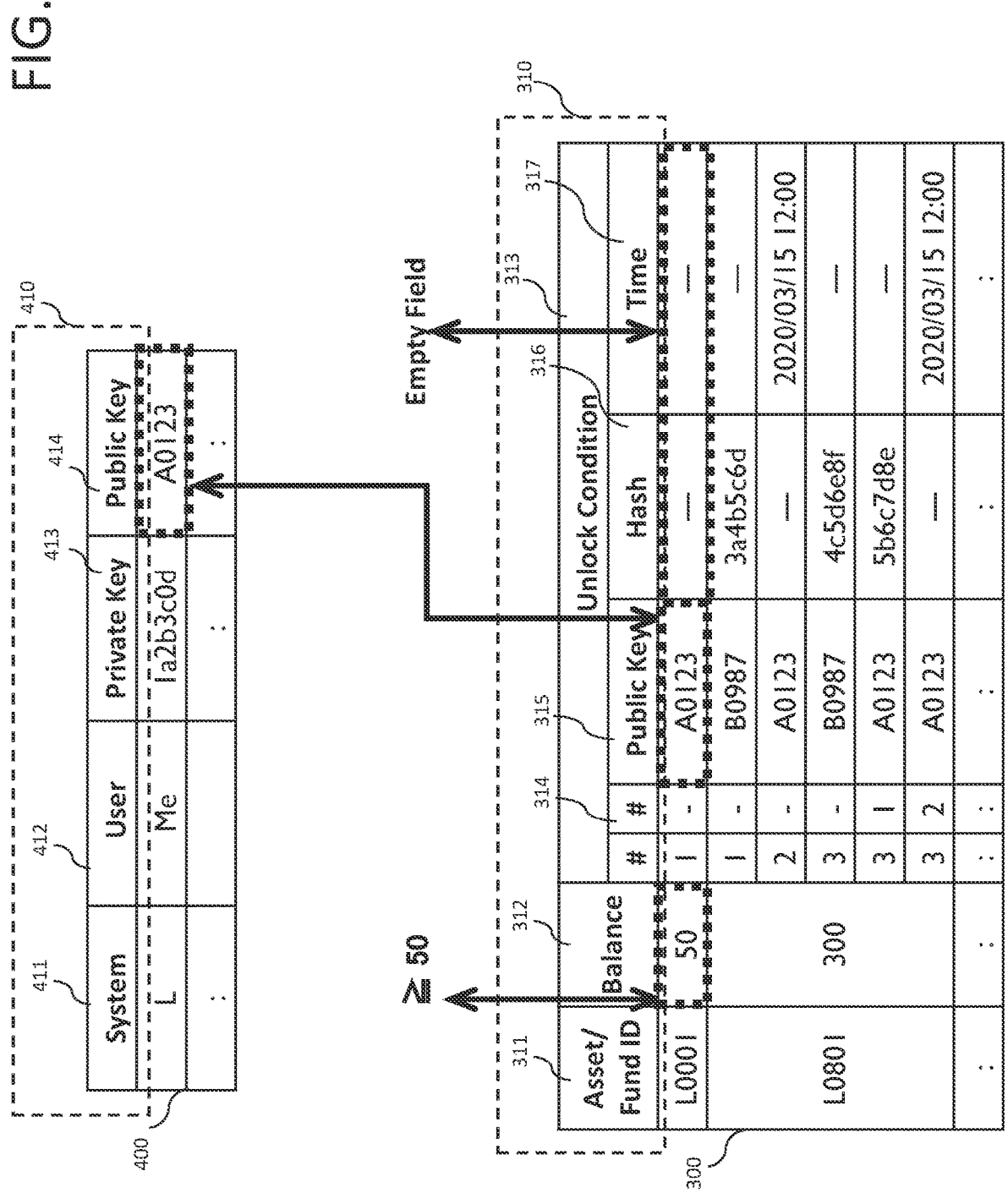
FIG. 13 is a figure which shows one example of the processing that selects the asset/fund used for the first initial transaction.

The processing of S202 will be described below with reference to FIG. 13.

The transaction issuing unit 113 acquires, from among the records of the key information table 400 read from the key information storage unit 121, the record in which the system name 411 is "L" and the user is "Me" (that is, "user A"), and acquires "A0123" which is the information of the public key 414.

Furthermore, the transaction issuing unit 113 reads the ledger 300 related to the assets/funds L stored in the ledger storage unit 154 of the asset/fund settlement device 150 via the asset/fund settlement device access unit 111. Then, among the read records of the ledger 300, the transaction issuing unit 113 acquire records such that the information corresponding to the unlock condition 313 is one row, the information corresponding to the public key 315 matches the above "A0123", and the information corresponding to the hash value 316 and the time 317 is blank.

Further, the transaction issuing unit 113 receives an instruction of the required quantity from the user, and selects records from the acquired records such that the balance 312 is equal to or greater than the instructed quantity. This means that the user A selects a record collateralizing assets/funds L of "50" or more, which is the quantity of the assets/funds L that the user A wishes to trade. Note that the selection of records may be performed by selecting one record whose balance 312 is equal to or greater than the indicated quantity, or by selecting multiple records whose balance 312 is less than the indicated quantity, and selecting the sum of the balances 312 equal to or greater than the indicated quantity.

If the sum of the balances 312 of the acquired records is less than the indicated quantity (S210: YES), the transaction cannot be made, so that the transaction execution processing is ended.

In this embodiment, we assume that the user A indicates "50", which is the transaction volume of the asset/fund L agreed in S201, and the transaction issuing unit 113 selects the record such that the value corresponding to the asset/fund ID 311 is "L0001".

Next, the transaction issuing device (user A) 110A selects a DvP transaction pattern (S203).

In this process, the transaction issuing unit 113 of the transaction issuing device (user A) 110A acquires the DvP transaction pattern stored in the shared area 180 via the shared area access unit 112. Further, based on user A's instruction, the transaction issuing unit 113 selects a DvP trading pattern that user A intends to trade. Additionally, the DvP transaction pattern is represented by the initial transaction template, the initial transaction execution result template, the parameter template, and the transaction status management information template, and is implemented by filling variable values in each.

Furthermore, the transaction issuing unit 113 writes the first initial transaction template 700A among the read initial transaction templates 700 of the DvP transaction pattern to the transaction-in-process storage unit 124. In addition, the transaction issuing unit 113 writes the first parameter template 900A among the parameter templates 900 of the read DvP transaction pattern to the parameter storage unit 122. Also, the transaction issuing unit 113 writes the first transaction status management information template 1000A among the read transaction status management information templates 1000 of the DvP transaction pattern to the transaction status management information storage unit 123.

Next, the transaction issuing device (user A) 110A acquires parameters necessary for creating a transaction (S204).

The transaction issuing unit 113 of the transaction issuing device (user A) 110A refers to the information in the key information storage unit 121, additionally generates necessary information, and writes the result to the parameter storage unit 122 as parameters.

The process of S204 will be described below with reference to FIGS. 14A and 14B.

Figure 14A:
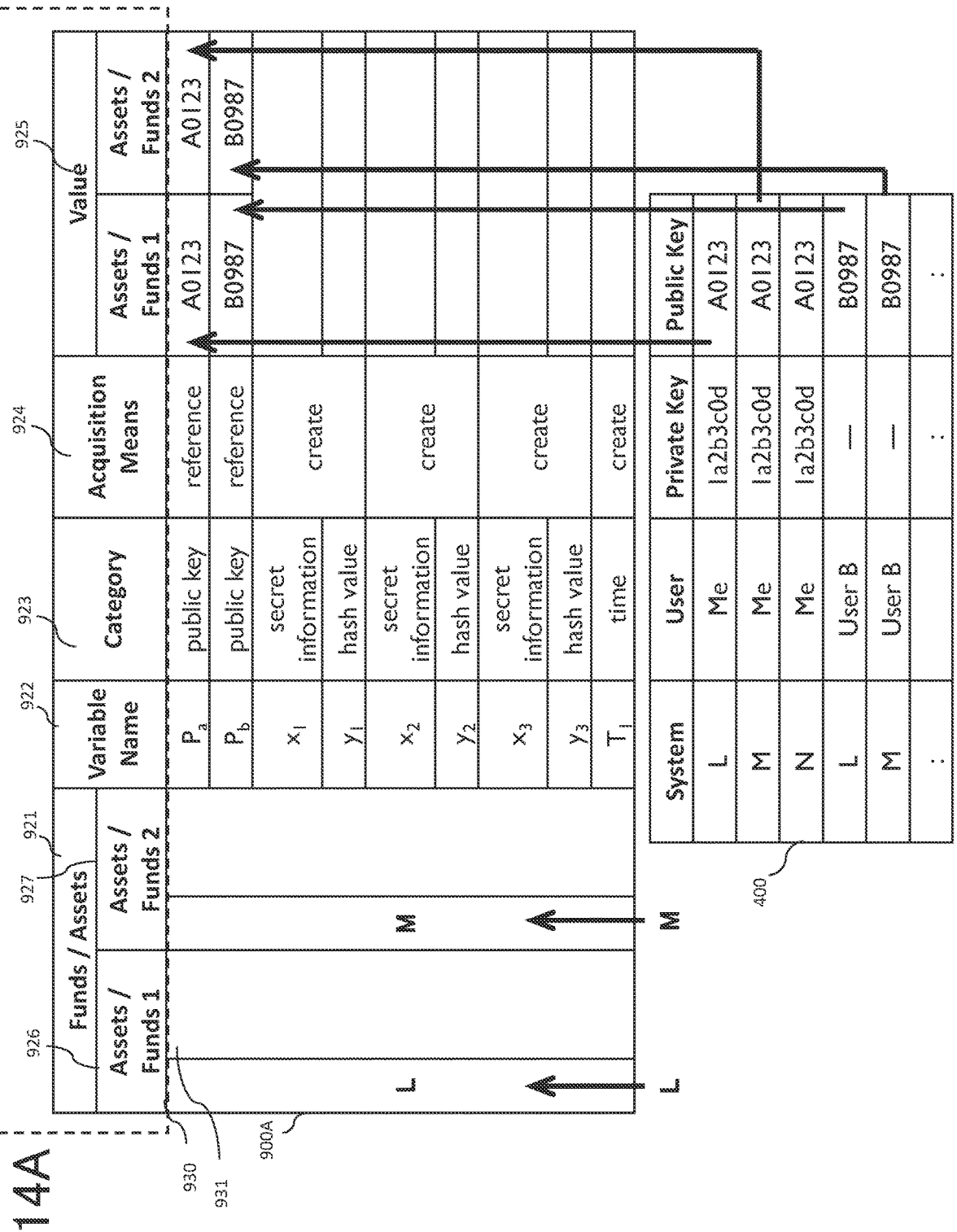
FIG. 14A is a diagram which shows one example of a process of acquiring parameter information (No. 1).

As shown in FIG. 14A, for the first system name and the second system name, "L" and "M" are entered, respectively, based on the agreement result of S201. For the value 925 of the record whose category 923 is "public key" and whose acquisition means 924 is "reference", the corresponding information is read from the key information table 400 and written.

Figure 14B:
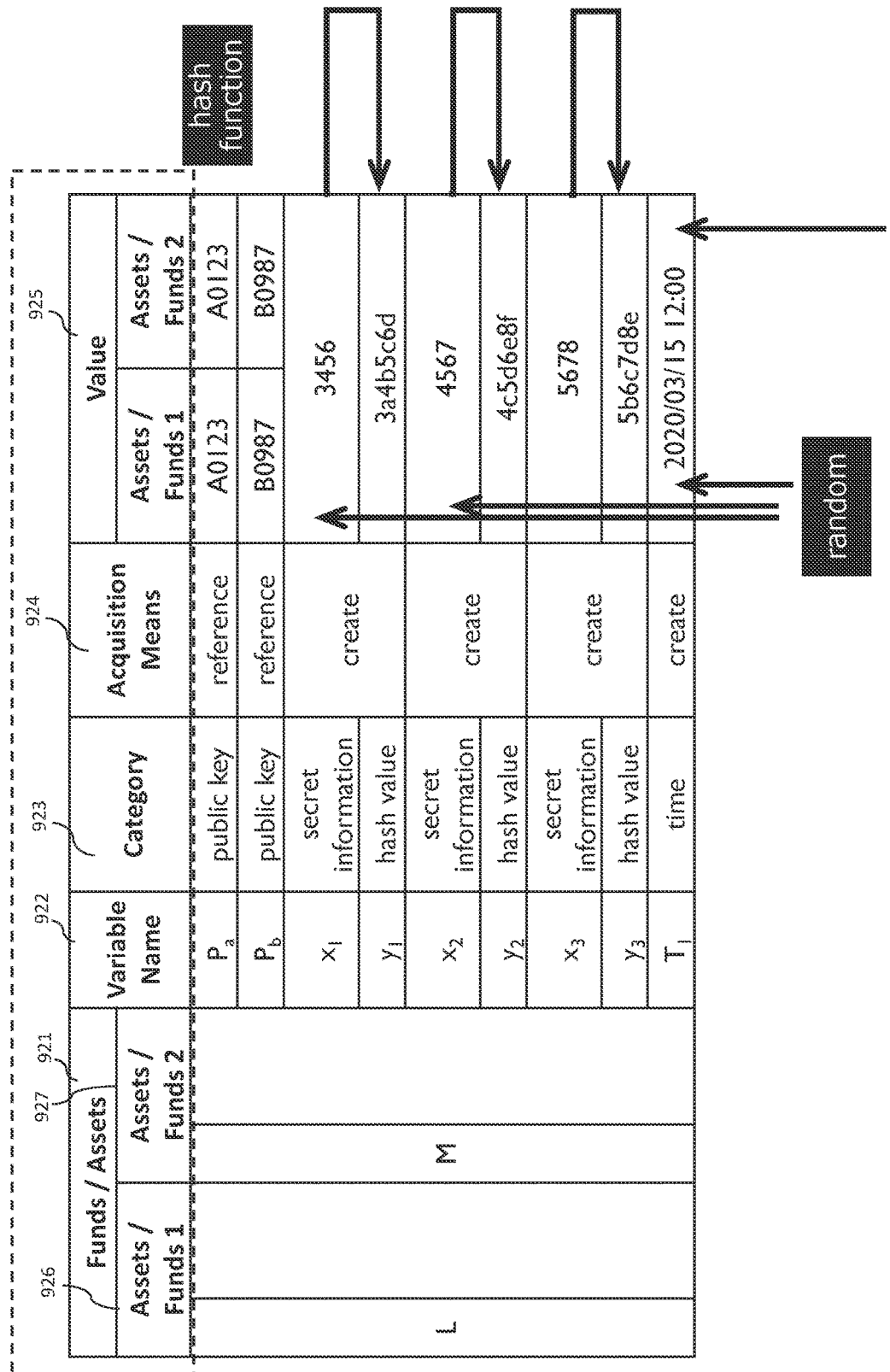
FIG. 14B is a diagram which shows one example of processing for acquiring parameter information (No. 2).

Next, as shown in FIG. 14B, a random numerical value is generated and written for the value 925 of the record whose category 923 is "secret information" and whose acquisition means is "creation". For the value 925 of the record whose category 923 is "hash value" and whose acquisition means is "create", the corresponding "secret information" is input and the output result of the predetermined hash function is written. In the example shown in FIG. 14B, a randomly generated value "3456" is written as the secret information $x_1$, and "3a4b5c6d" is written as the corresponding hash value $y_1$. As for the time, the system clock is referred to, and the current time plus the fixed timeout period specified by the transaction is calculated and written.

The parameter template that has been written is written in the parameter storage unit 122 as a parameter table.

Next, the transaction issuing device (user A) 110A creates and transmits a transaction (S205).

In this process, the transaction issuing unit 113 of the transaction issuing device (user A) 110A complements the key information read from the key information storage unit 121 and the parameters read from the parameter storage unit to the transactions read from the transaction-in-process storage unit 124, after complementing, and then transmits the transactions to the asset/fund settlement device 150L via the asset/fund settlement device access unit 111.

The transmitted transactions are stored in the pre-execution transaction storage unit 156 by the transaction reception unit 151 of the asset/fund settlement device 150L, and then sequentially determined by the transaction executability determination unit 152 for executability. Transactions determined to be executable by the transaction executability determination unit are reflected in the ledger 300 of the ledger storage unit 154 and written to the executed transaction storage unit 155 by the transaction execution unit 153. The result is then notified to the transaction issuing device 110A.

The first initial transaction creation process in this embodiment will be described below with reference to FIGS. 15A and 15B.

As shown in FIG. 15A, among the data of the initial transaction template 700A acquired in S203, a unique value for the value corresponding to the transaction ID 721, the value of the asset/fund ID 311 of the record selected in S202 for the value corresponding to the asset/fund ID 722 and the quantity "50", which is the agreed result of S201, for the value corresponding to the amount of money 723, are written, respectively.

Figure 15B:
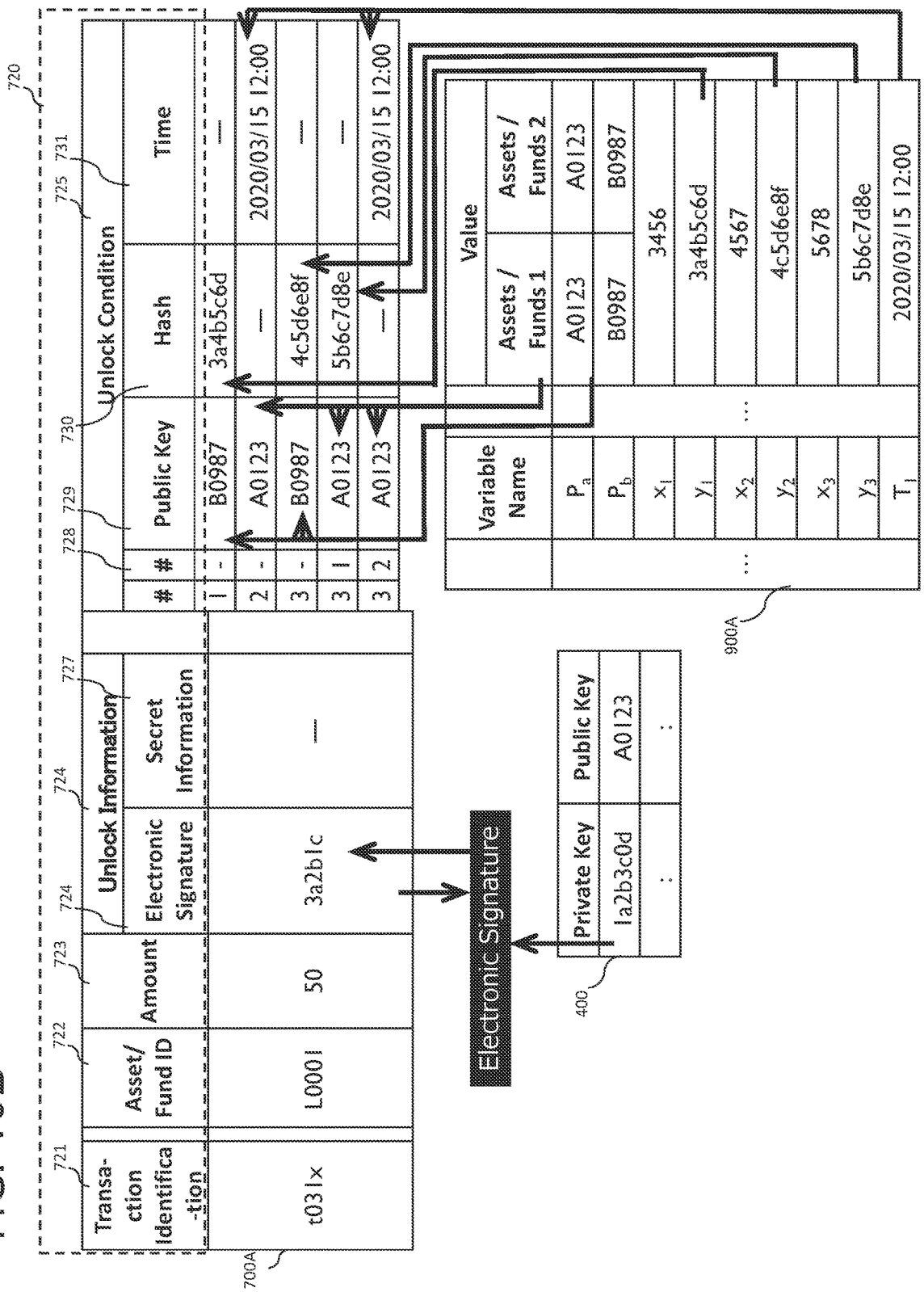
FIG. 15B is a diagram which shows one example of first initial transaction creation processing (No. 2).

Next, as shown in FIG. 15B, the data of the lock release condition 725 among the data of the initial transaction template 700A is referred to the parameter table read from the parameter storage unit 122, and the corresponding data is reflected.

Next, as for the value corresponding to the electronic signature 724, the generated electronic signature is written using the value corresponding to the private key 413 held in the key information table 400. The plaintext data of this electronic signature is, for example, the binary data of the transaction ID 721, asset/fund ID 722, amount 723, and lock release condition 725 of the initial transaction record generated from this initial transaction template 700A, and a digital signature is generated by taking a hash value with the private held by user A and encrypting it, so that a person who verifies it can verify it with the public key corresponding to the private key.

Figure 16:
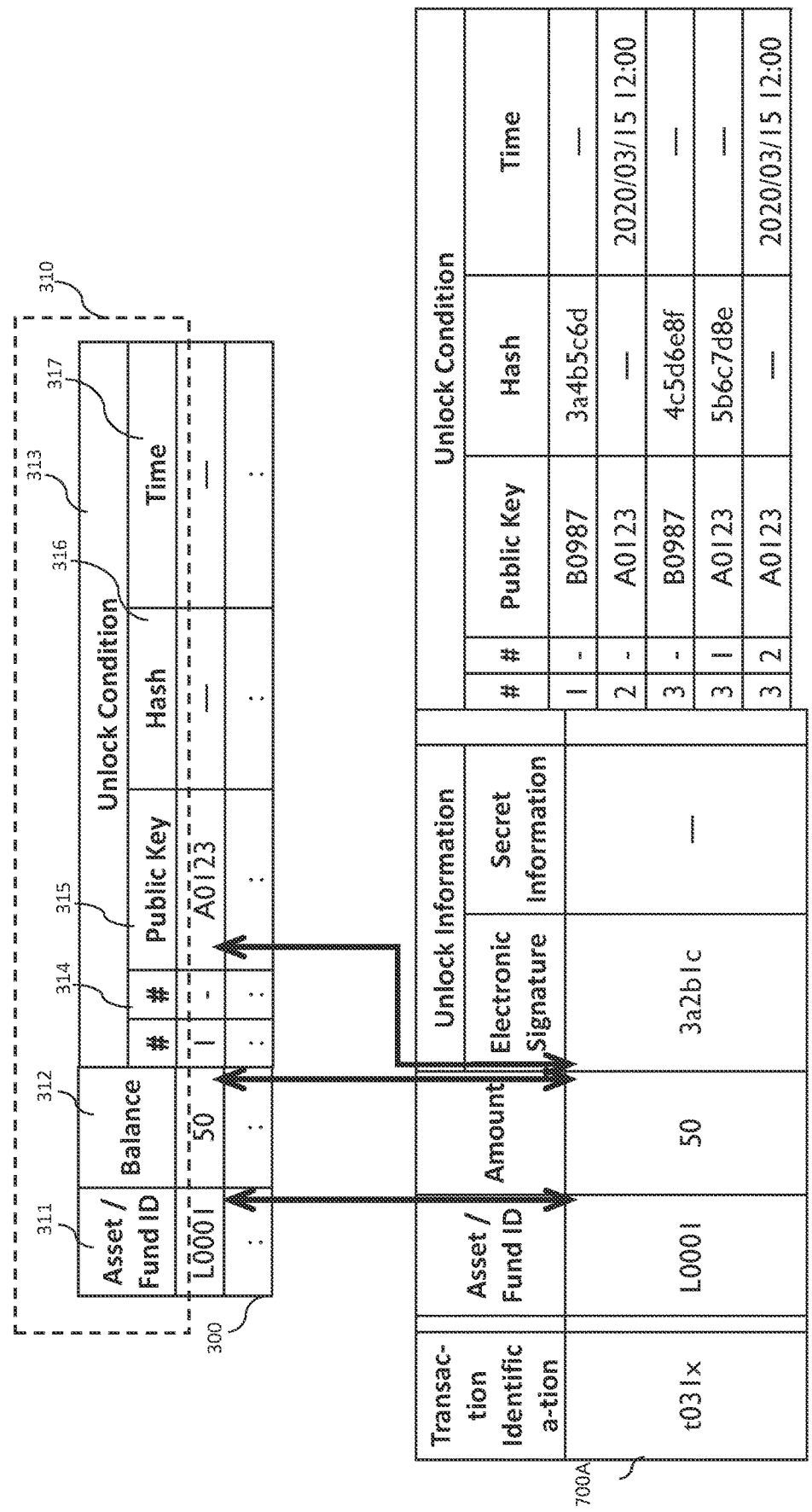
FIG. 16 is a figure which shows one example of the processing which decides the execution propriety of the first initial transaction.

Next, the process of determining whether the first initial transaction can be executed will be described with reference to FIG. 16.

The transaction executability determination unit 152 of the asset/fund settlement device 150L reads one transaction from the pre-execution transaction storage unit 156 and reads the record corresponding to the data of the described asset/fund ID 722 from the ledger storage unit 154. Furthermore, the transaction executability determination unit 152 confirms that the value of the balance 312 must be equal to or greater than the value of the transaction amount 723 (user A who conducts the transaction must possess the specified assets/funds), and the content of the unlock condition 313 must be satisfied with the contents of the release information 724. Here, since the data corresponding to the lock release condition 313 is only "there is an electronic signature corresponding to the public key A0123", the transaction executability determination unit 152 determines whether or not the transaction can be executed by verifying the data of the electronic signature with the read out public key. That is, the transaction executability determination unit 152 determines whether the value obtained by decrypting the electronic signature with the public key matches the hash value of the binary data of the transaction ID 721, asset/fund ID 722, amount 723, and lock release condition 725 of the record. If determined to be executable, the transaction is handed over to the transaction execution unit 153.

Next, execution processing of the first initial transaction in this embodiment will be described with reference to FIG. 17.

The transaction execution unit 153 of the asset/fund settlement device 150L reflects the details of the transaction handed over from the transaction executability determination unit 152 to the ledger.

Among the records of the ledger 300, the transaction execution unit 153 acquires the record having the same asset/fund ID 311 data as the asset/fund ID 722 data described in the transaction. Then, in the acquired record, when the data of the lock release condition 313 is one row, the following processing is performed.

First, the transaction execution unit 153 subtracts the amount of the balance 312 of the acquired record by the numerical value described in the transaction amount 723 (in FIG. 17, the balance of the record "L005" has become 0). After that, the transaction execution unit 153 creates a new record, and adds to the ledger 300. For the added record, a unique value ("L0005" in FIG. 17) is generated and written in the asset/fund ID 311 data. As for the data of the balance 312, the numerical value described in the transaction amount 723 is transferred. As for the lock release condition 313, the contents of the transaction lock release condition 725 are transferred. When the processing is completed, the transaction execution unit 153 writes the transaction in the executed transaction storage unit 155, and notifies the information of the asset/fund ID 312 of the created ledger to the transaction issuing device 110A.

Note that the operation when the data of the lock release condition 313 in the acquired record is multiple lines will be described later.

Next, the transaction issuing device 110A updates the transaction status (S206).

In this process, the transaction status management unit 114 of the transaction issuing device 110A updates the parameter table held by the parameter storage unit 122 and the transaction status management information table held by the transaction status management information storage unit 123, via the asset/fund settlement device access unit 111, based on the result notified from the asset/fund settlement device 150L.

Processing for updating the transaction status according to the execution result of the first initial transaction in this embodiment will be described below with reference to FIG. 18.

The transaction status management unit 114 of the transaction issuing device 110A receives the asset/fund ID "L0005" of the record created in the ledger as the transaction execution result via the asset/fund settlement device access unit 111. Further, the transaction status management unit 114 reads the parameter table from the parameter storage unit 122, and writes "L0005" as the first asset/fund ID. Further, the transaction status management unit 114 reads the transaction management information table from the transaction status management information storage unit 123, and writes "L0005" as the first asset/fund ID.

Next, the second initial transaction execution processing in the electronic payment system will be described with reference to the necessary figures according to the flow of the flowchart of FIG. 19.

The second initial transaction is a transaction for locking and securing assets/funds M to be handed over to user A by user B, and for setting processing conditions.

First, information about the transaction status is shared among the concurrent parties (S1901). Specifically, information is shared with user B about the addition of a record with asset/fund ID "L0005" to the ledger as a result of user A executing a transaction.

This step of S1901 is a process performed between user A and user B without going through the electronic payment system of this embodiment.

S1902 to S1908 are processes executed by the user B and the transaction issuing device 110B.

First, the transaction issuing device 110B selects assets/funds to be used for the second initial transaction (S1902).

Figure 20:
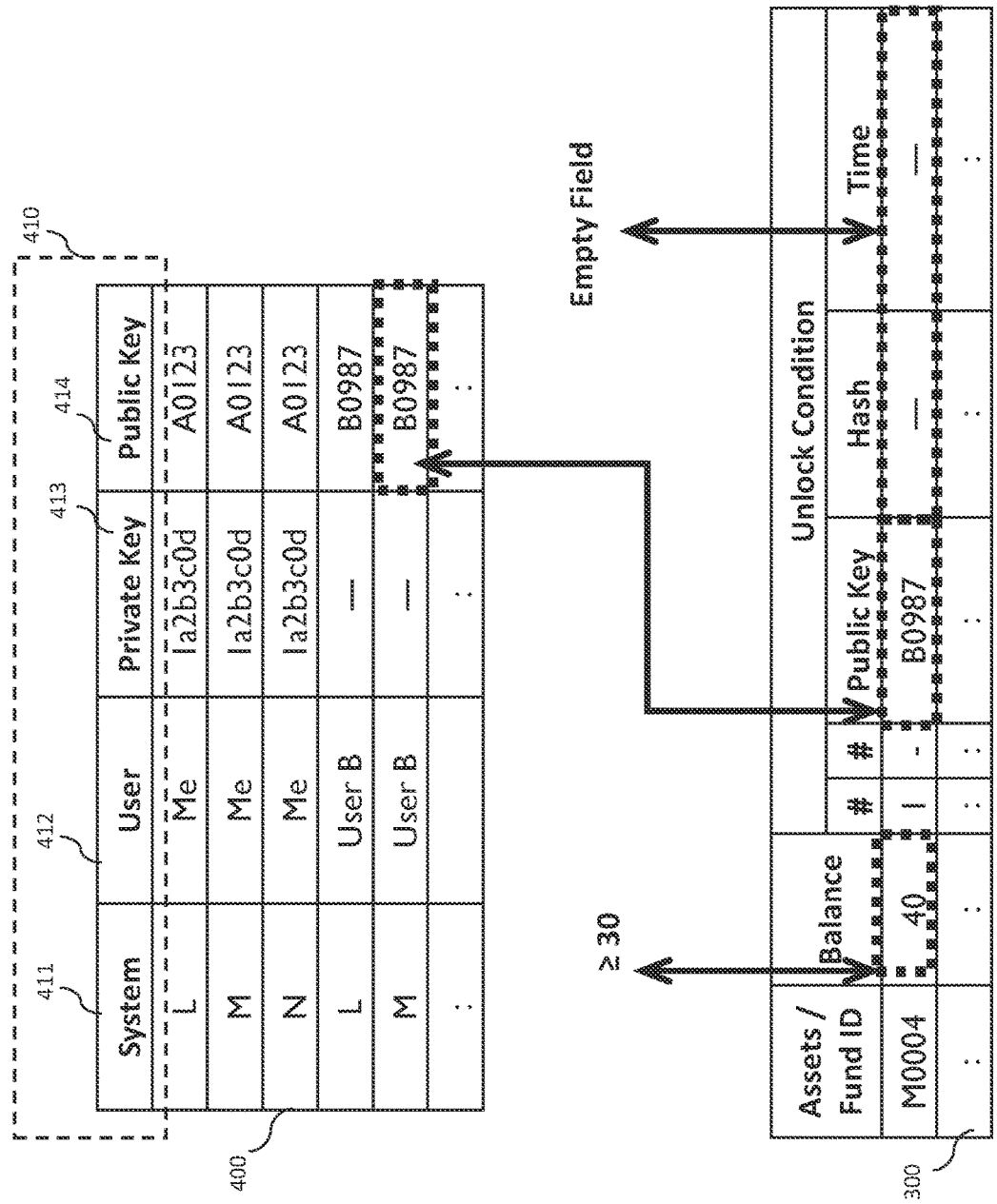
FIG. 20 is a diagram which shows one example of processing for selecting assets/funds to be used for the second initial transaction.

Processing for selecting assets/funds to be used for the second initial transaction of this embodiment will be described below with reference to FIG. 20.

The transaction issuing unit 113 of the transaction issuing device 110B selects a record in which the system name 411 is "M" and the user is "Me" (user B) among the records of the key information table 400 read from the key information storage unit 121, and acquires "B0987", which is the information of the public key 414.

Furthermore, the transaction issuing unit 113 reads the ledger 300 regarding the assets/funds L from the ledger storage unit 154 of the asset/fund settlement device 150 via the asset/fund settlement device access unit 111. Among the read records of the ledger 300, the transaction issuing unit 113 acquires records such that the information corresponding to the unlock condition 313 is one row, and the information corresponding to the public key 315 matches the read "B0987", and the information corresponding to the hash value 316 and the time 317 is blank.

Furthermore, the transaction issuing unit 113 receives an instruction of the required quantity from the user, and selects the records such that the balance 312 from the acquired record becomes equal to or greater than the instructed quantity (the user B who conducts the transaction holds the specified assets/funds). Additionally, the selection of records may be performed by selecting one record whose balance 312 is equal to or greater than the indicated quantity, or by selecting multiple records whose balance 312 is less than the indicated quantity, and selecting the sum of the balances 312 equal to or greater than the indicated quantity.

Figure 19:
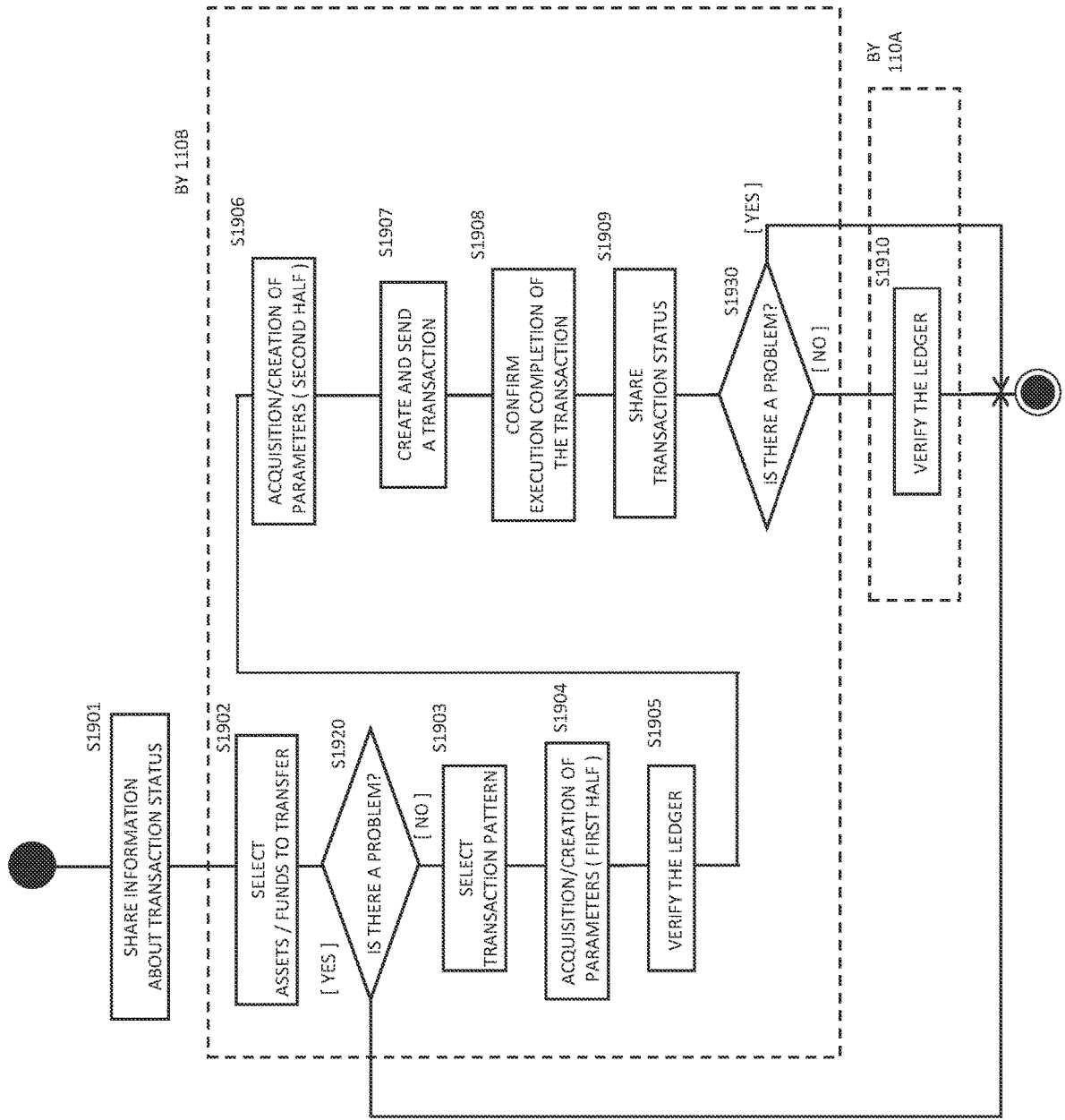
FIG. 19 is a flow chart which shows second initial transaction execution processing in the electronic payment system.

Furthermore, if the sum of the balances 312 of the acquired records is less than the specified quantity, the second initial transaction execution process shown in FIG. 19 is terminated because the transaction is impossible.

In this embodiment, we assume that the user B indicates "30", which is the transaction volume of the asset/funds M agreed in S201, and the transaction issuing unit 113 selects the record such that the value corresponding to the asset/funds ID 311 is "M0004".

Next, the transaction issuing device 110B selects a DvP transaction pattern (S1903).

In this process, the transaction issuing unit 113 of the transaction issuing device 110B acquires the DvP transaction pattern stored in the shared area 180 via the shared area access unit 112, and further selects the DvP transaction pattern based on the user B's instruction.

Furthermore, the transaction issuing unit 113 writes the second initial transaction template 700B among the read initial transaction templates of the DvP transaction pattern to the transaction-in-process storage unit 124. Also, the transaction issuing unit 113 writes the second parameter template 900B of the read parameter templates of the DvP transaction pattern in the parameter storage unit 122. Also, among the read transaction status management information templates of the DvP transaction pattern, the transaction issuing unit 113 writes the second transaction status management information template 1000B in the transaction status management information storage unit 123.

In this embodiment, we assume that based on the agreement result in S201, the asset transfer flow 640 of the DvP transaction pattern in FIG. 10 is selected, and second initial transaction template 700B of FIG. 7, the second parameter template 900B of FIG. 8B and the second transaction status management information template 1000B of FIG. 10 are written as the transaction, the parameter table, and the transaction status management table in the transaction-in-process storage unit 124, the parameter storage unit 122, and the transaction status management information storage unit 123, respectively.

Next, the transaction issuing device 110B acquires or creates parameters necessary for transaction creation (first half: S1904).

In this process, the transaction issuing unit 113 of the transaction issuing device 110B refers to the key information table of the key information storage unit 121, and writes necessary information to the parameter table in the parameter storage unit 122.

Figure 21A:
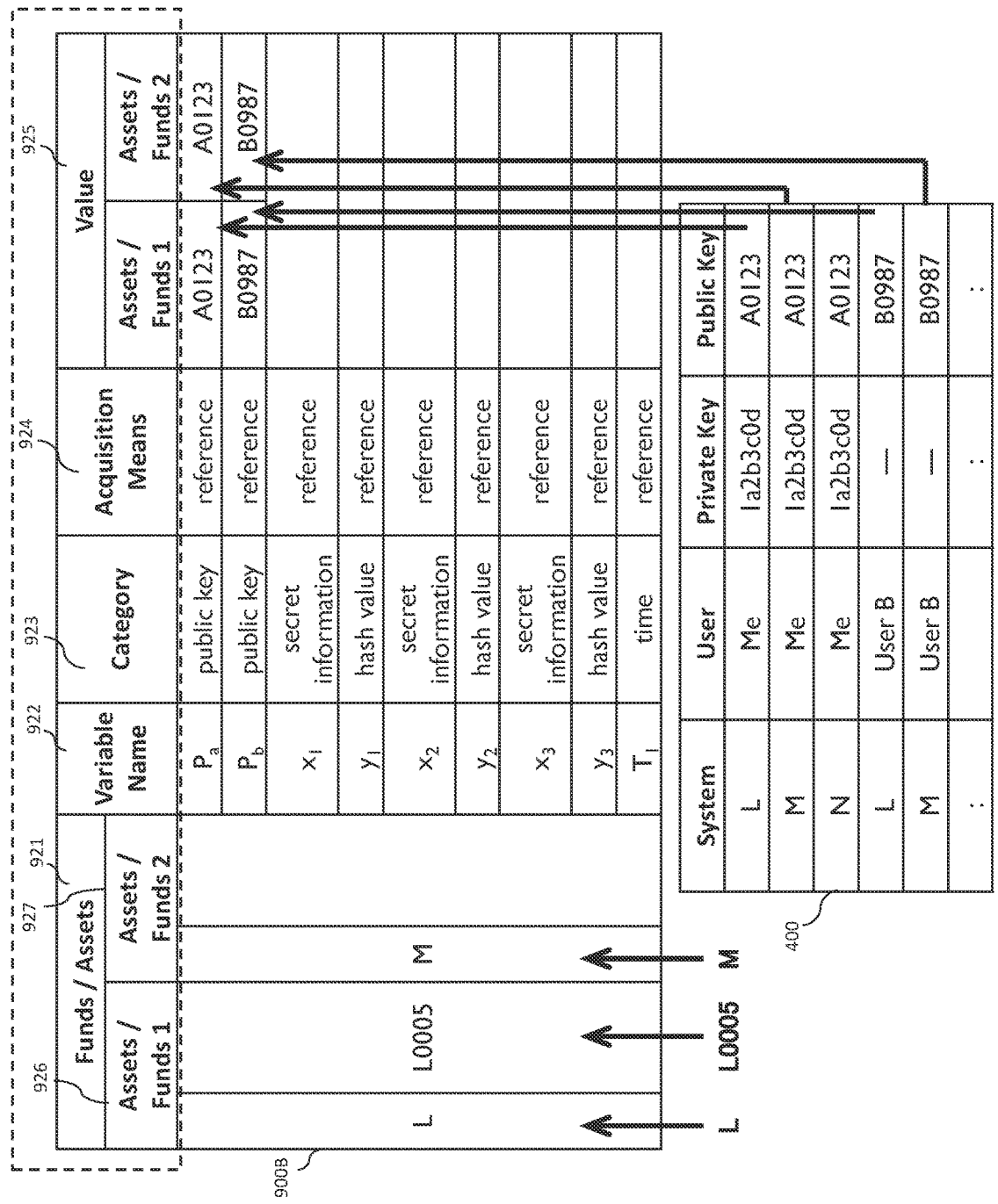
FIG. 21A is a diagram which shows one example of a process of acquiring parameter information (No. 1).

The first half of the process of acquiring or creating the parameters necessary for creating a transaction in this embodiment will be described below with reference to FIG. 21A (the latter half will be described later with reference to FIG. 21B).

Figure 12:
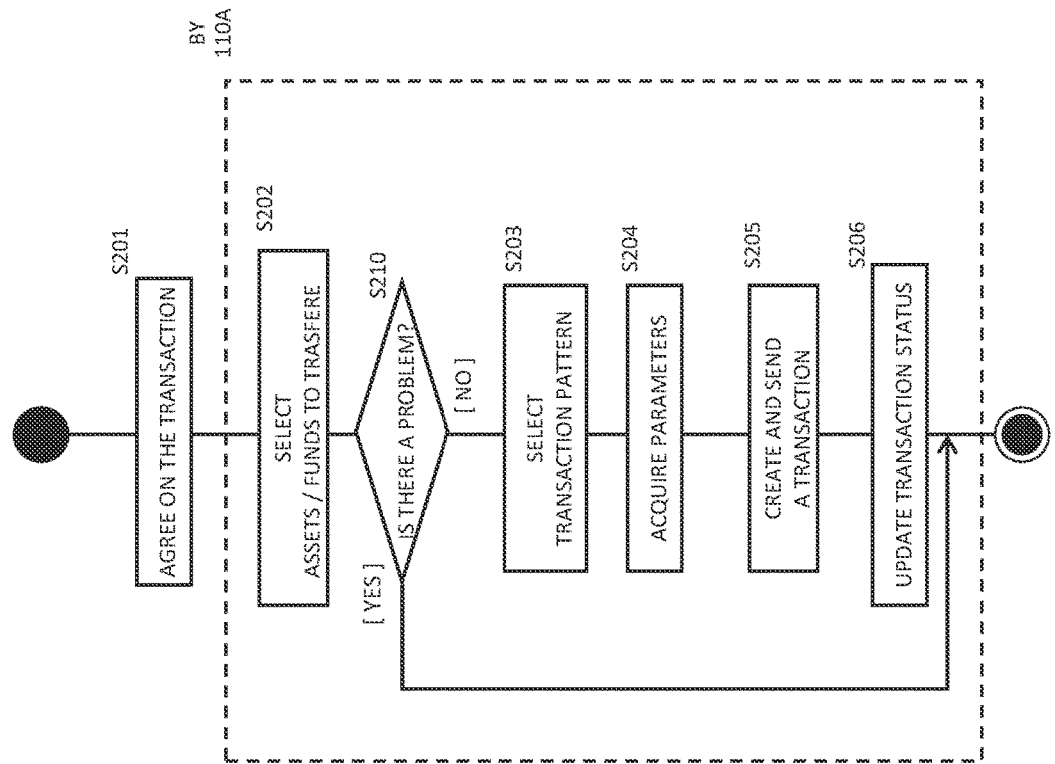
FIG. 12 is the flowchart which shows the first initial transaction execution processing in the electronic payment system.

For the first system name and the second system name, "L" and "M" are entered, respectively, based on the agreement result of S201 in FIG. 12. For the first asset/fund ID, "L0005" notified in S1901 is entered. For the value 925 of the record whose category 923 is "public key" and whose acquisition means 924 is "reference", the corresponding information is read from the key information table 400 and written.

Next, the transaction issuing device 110B verifies the transaction execution result of the assets/funds L by user A (S1905).

In this process, the transaction issuing unit 113 of the transaction issuing device 110B complements the first initial transaction execution result template 800A of the DvP transaction pattern read in S1903 with the parameters read from the parameter storage unit 122. And then the transaction issuing unit 113 verifies the execution result of the transaction, by comparing the supplemented result with the ledger of the asset/fund management system 150 read out via the asset/fund access unit 111.

Further, if there is a discrepancy between the information read from the ledger and the result of supplementing the initial transaction execution result template, it is determined that there is a problem (S1920: YES), the second initial transaction execution process shown in FIG. 19 is terminated, because there is a difference in recognition of the transaction content, and the transaction since continuation is not possible.

Figure 22:
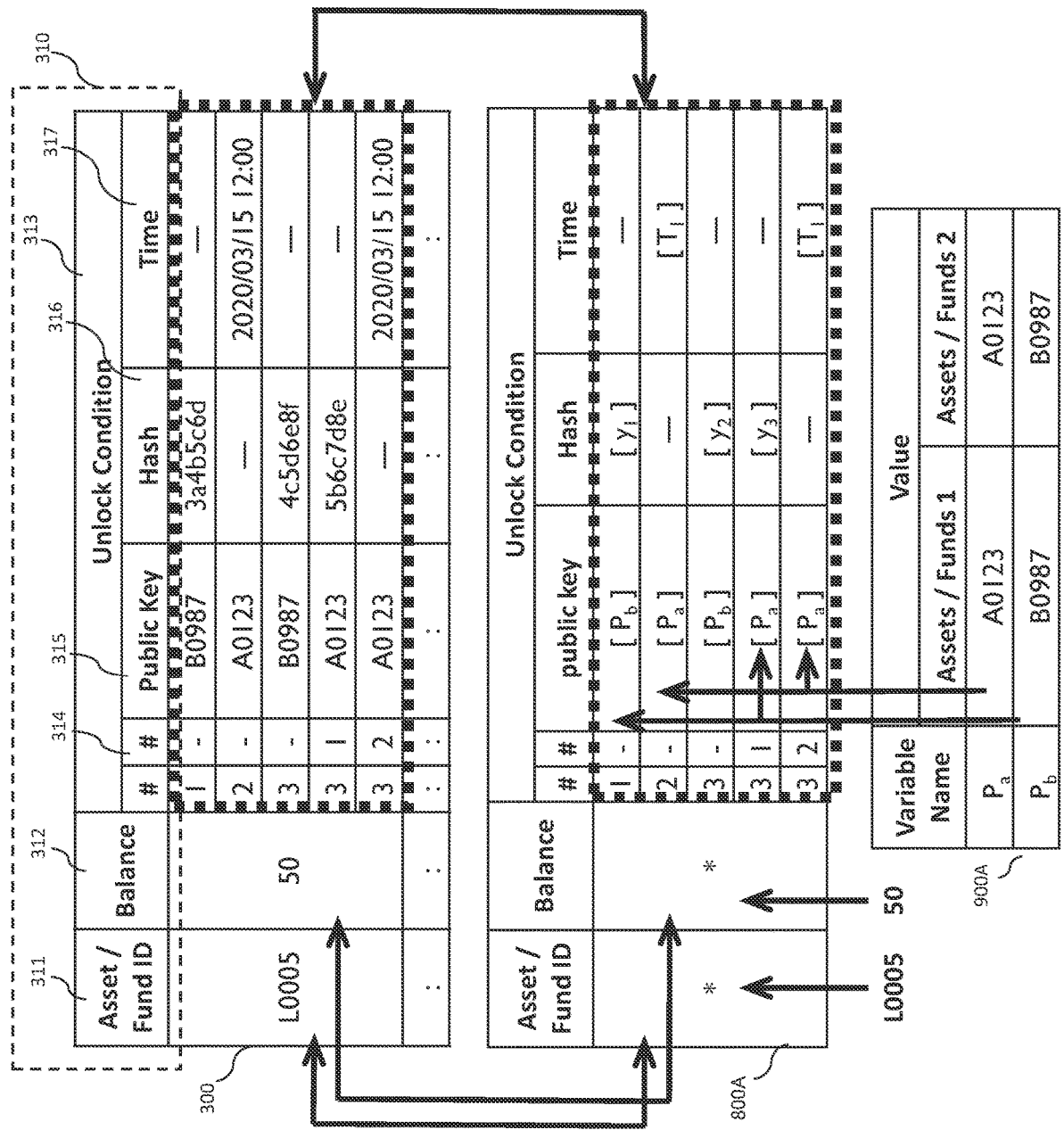
FIG. 22 is a diagram which shows one example of processing for verifying the execution result of the first initial transaction.

Processing for verifying the execution result of the first initial transaction in this embodiment will be described below with reference to FIG. 22.

Of the first initial transaction execution result template 800A of the DvP transaction pattern read in S1903, the asset/fund ID 821 and the balance 822 are supplemented based on the content agreed in S201 of FIG. 12. Furthermore, the variable name described in the lock release condition 823 is complemented with the parameter read from the parameter storage unit 122. The first initial transaction execution result template 800A that has been complemented is compared with the content of the corresponding record read out from the ledger to confirm that they match.

Moreover, comparison verification is skipped for portions of the lock release conditions 823 for which the corresponding parameters could not be complemented. In FIG. 22, some of the data of hash value 826 and time 827 of the initial transaction execution result template 800A cannot be complemented, so verification of the data corresponding to hash value 316 and time 317 of the ledger is skipped.

Next, the transaction issuing device 110B acquires or creates parameters necessary for transaction creation (second half: S1904).

In this process, the transaction issuing device 110B complements the parameters read from the parameter storage unit 122 using the information read from the ledger via the asset/fund settlement device access unit 111.

The second half of the process of acquiring or creating the parameters required for creating a transaction in this embodiment will be described below with reference to FIG. 21B (the first half has already been described with reference to FIG. 21A).

Regarding the value 925 of the record whose category 923 is "hash value" or "time" and whose acquisition means 924 is "reference", the transaction issuing device 110B extracts and reflects the corresponding value of the unlock conditions of the corresponding record in the ledger, in consideration of the variable name described in the lock release condition 823 of the first initial transaction execution result template 800B. Also, the transaction issuing device 110B inputs an appropriate value for a record whose category 923 is "time" and whose acquisition means 924 is "creation".

Further, as for the parameter, for a record in which the category 923 is "secret information" and the acquisition means 924 is "reference", the value cannot be acquired at the time of this step, so the column is blank.

Next, the transaction issuing device 110B creates and transmits a transaction (S1907).

In this process, the transaction issuing unit 113 of the transaction issuing device 110B complements the transaction read from the transaction-in-process storage unit 124 with the key information table read from the key information storage unit and the parameters read from the parameter storage unit to complete the transaction, after that, transmits to the asset/fund settlement device 150 via the asset/fund settlement device access unit 111. The transmitted transaction is processed in asset/fund settlement device 150, and the result is reflected in the ledger of ledger storage unit 154 and notified to transaction issuing device 110B.

Execution processing of the second initial transaction in this embodiment will be described below with reference to FIG. 23.

The execution processing of the second initial transaction in this embodiment is the same as the execution processing of the first initial transaction in FIG. 17.

Here, since it relates to the asset/fund M, the asset/fund ID, the balance, etc. are different.

Next, the transaction issuing device 110B updates the transaction status (S1908).

In this process, the transaction status management unit 114 of the transaction issuing device 110B updates the transaction status management information table held by the transaction status management information storage unit 123, and the parameters held by the parameter storage unit 122, based on the result notified from the asset/fund settlement device 150M via the asset/fund settlement device access unit 111.

Figure 24:
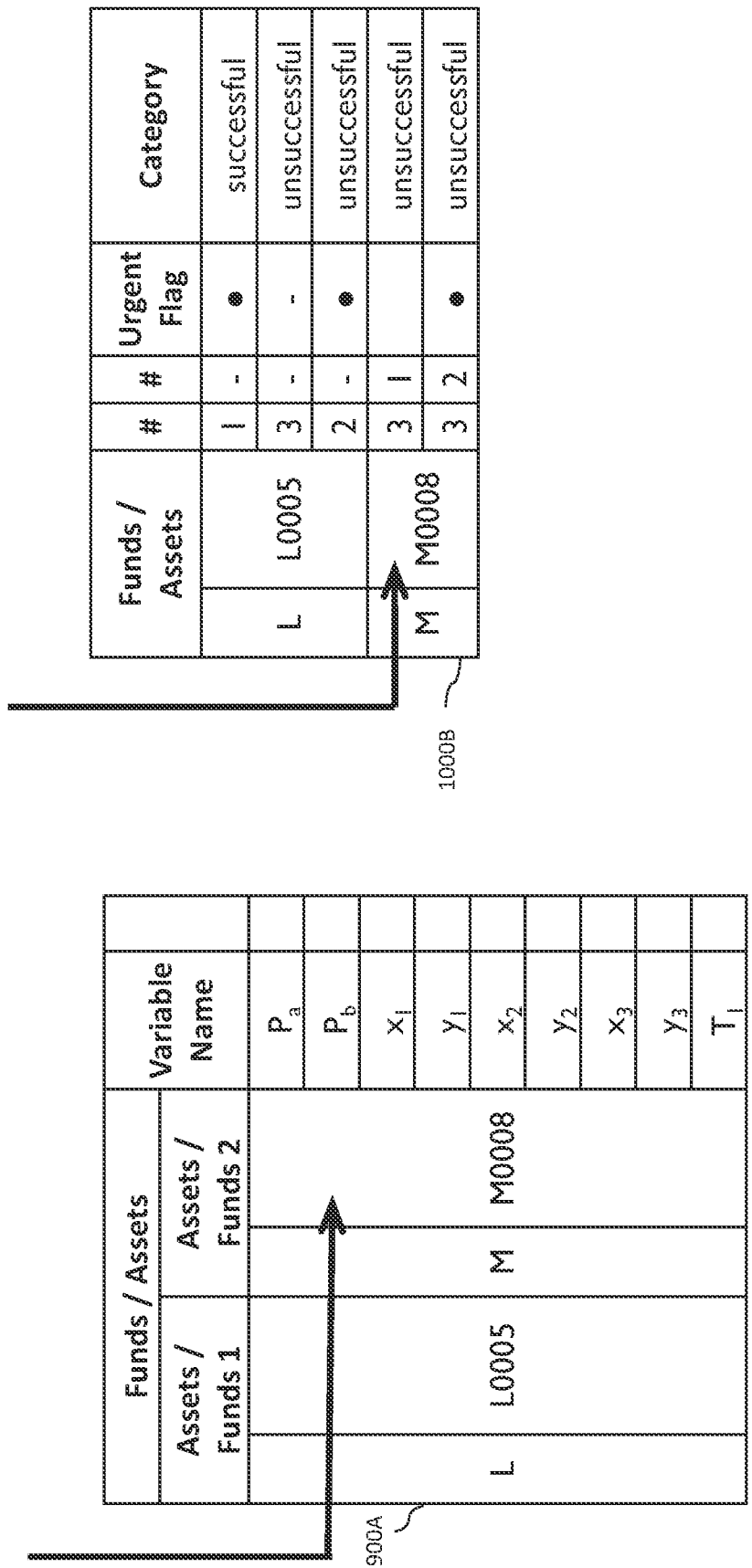
FIG. 24 is a diagram illustrating one example of processing for confirming execution results of the second initial transaction.

Processing for updating the transaction status according to the execution result of the second initial transaction in this embodiment will be described below with reference to FIG. 24.

The transaction status management unit 114 of the transaction issuing device 110B receives the asset/fund ID "M0008" of the record created in the ledger 300 as the transaction execution result via the asset/fund settlement device access unit 111. Further, the transaction status management unit 114 reads the parameter from the parameter storage unit 122, and writes "M0008" as the second asset/fund ID. Also, the transaction status management unit 114 reads the transaction management information table from the transaction status management information storage unit 123, and writes "M0008" as the second asset/fund ID.

Next, the transaction status is shared among the concurrent parties (S1909). Specifically, user A is informed that a record with asset/fund ID "M0008" has been added to the ledger as a result of user B's execution of the transaction.

The process of S1909 is a step performed between user A and user B without going through the electronic payment system of this embodiment.

Next, the transaction issuing device 110A verifies the transaction execution result of the assets/funds M by user B (S1910).

The process of S1910 is a process executed by the transaction issuing device 110A by user A.

In this process, the transaction issuing device 110A complements the second initial transaction execution result template 800B of the DvP transaction pattern read in S203 with the parameters read from the parameter storage unit 122, and converts the complemented result into an asset/fund, and verifies the execution result of the transaction by comparing it with the ledger of the asset/fund management system 160 read out via the asset/fund access unit.

Furthermore, if discrepancies are found between the information read from the ledger and the result of supplementing the initial transaction execution result template, user A edits the transaction management information in the transaction status management information storage unit 123 to set the withdrawal of the assets/funds L related to the first initial transaction (not shown), because there is a difference in recognition of the transaction details, and it is impossible to continue the transaction.

Processing for verifying the execution result of the second initial transaction in this embodiment will be described below with reference to FIGS. 25A to 25C.

Figure 25A:
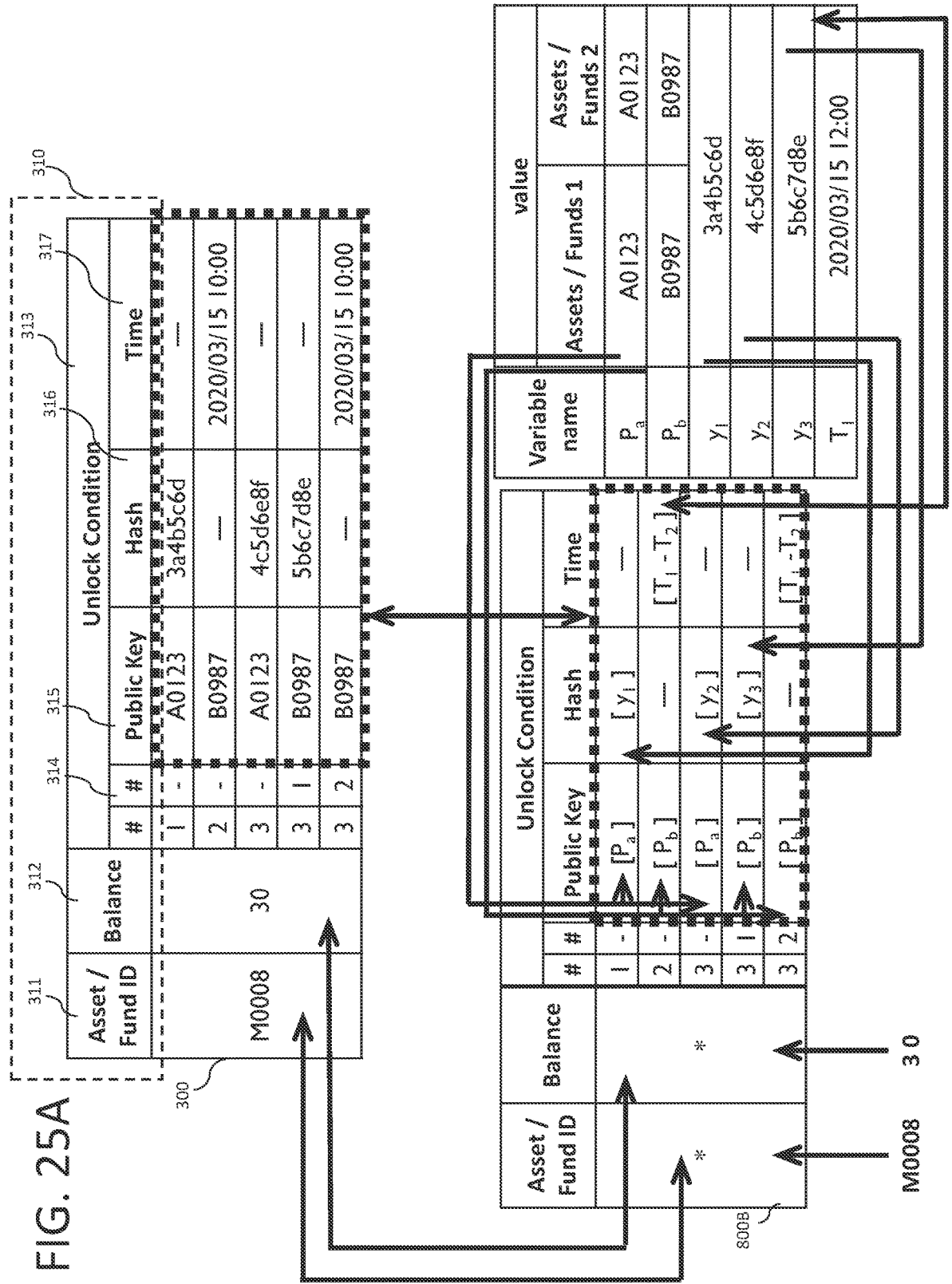
FIG. 25A is a diagram which shows one example of processing for verifying the execution result of the second initial transaction (No. 1).

In the process of verifying the execution result of the second initial transaction, in the second initial transaction execution result template 800A of the DvP transaction pattern read in S203, as shown in FIG. 25A, the asset/fund ID 821, the balance 822 are complemented based on the content agreed in S201 of FIG. 12. Furthermore, the variable name described in the lock release condition 823 is complemented with the parameter read from the parameter storage unit 122. Then, the transaction issuing device 110A compares the complemented second initial transaction execution result template 800A with the content of the corresponding record read from the ledger to confirm that they match.

Next, transaction issuing device 110A writes "M0008" to second asset/fund ID 927 of the parameter table of parameter storage unit 122.

Also, transaction issuing device 110A writes "M0008" in the second asset/fund ID 1021 of the transaction status management information table of the transaction status management information storage unit 123.

Figure 25C:
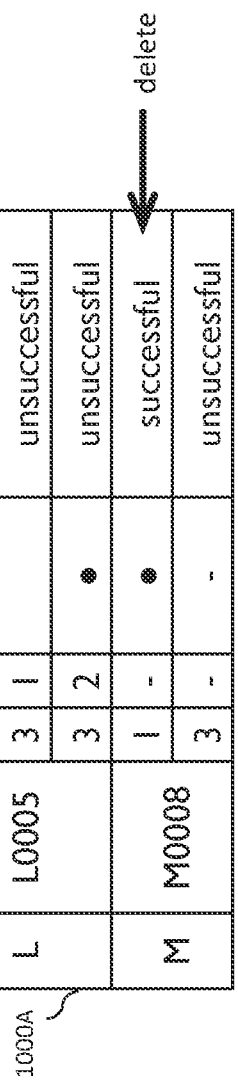
FIG. 25C is a diagram which shows one example of processing for verifying the execution result of the second initial transaction (No. 3).

Next, if there is a problem as a result of the verification, the transaction issuing device 110A reads out the transaction management information table from the transaction status management information storage unit 123 as shown in FIG. 25C, and deletes the record whose category 123 is "successful".

Figure 26:
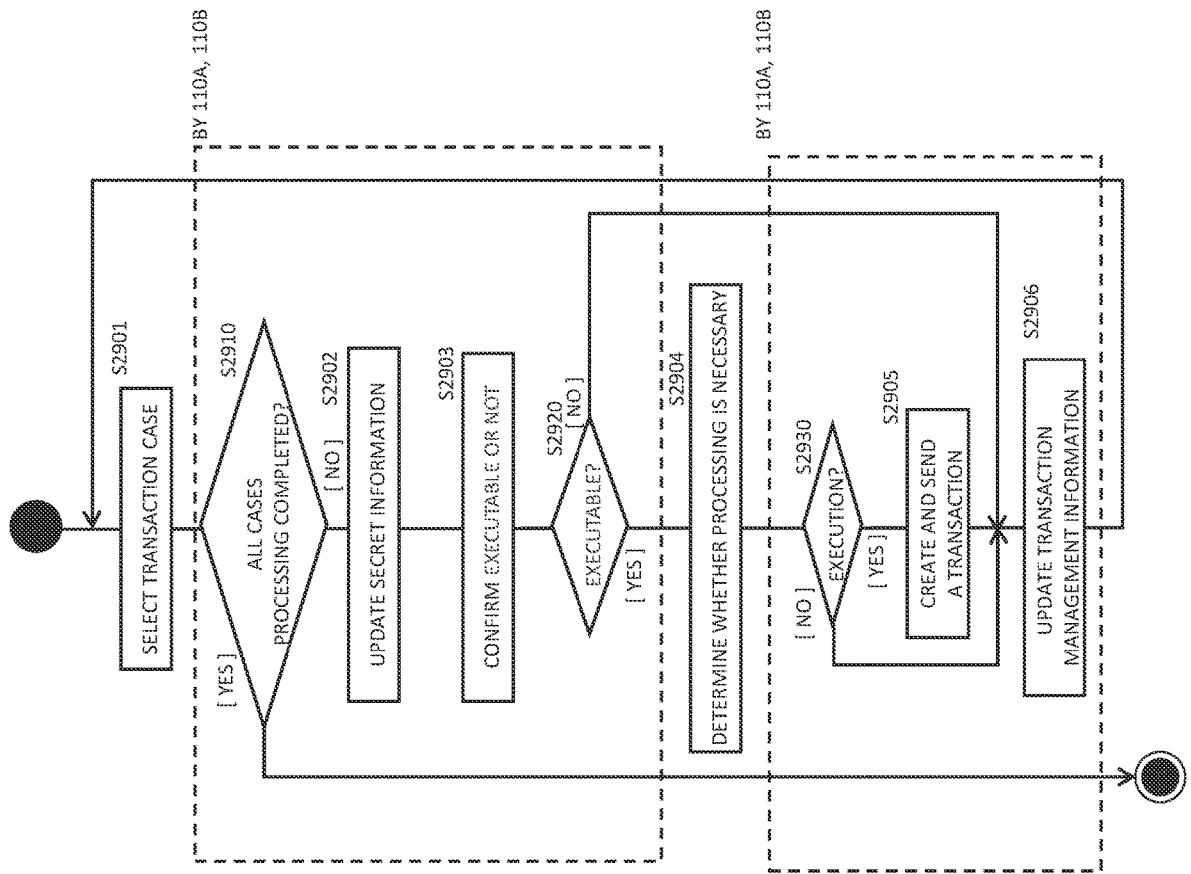
FIG. 26 is a flow chart which shows the operation when issuing a normal transaction after the initial transaction of the electronic payment system.

Next, the normal transaction execution processing in the electronic payment system will be described according to the flow of the flow chart of FIG. 26 and with reference to the necessary figures.

S2901 is a step that user B executes.

Also, the processes of S2910, S2902, S2903, S2920, S2930, S2905, and S2906 are steps independently executed by transaction issuing device 110A or transaction issuing device 110.

Hereinafter, in this embodiment, we suppose these steps will be described with the case of being executed by the transaction issuing device 110B.

First, the transaction issuing device 110B displays the transaction status management information table stored in the transaction status management information storage unit 123, and user B selects a transaction case for which transaction execution is to be considered (S2901).

If all cases in the transaction status management information table have been completed (S2910: YES), the normal transaction execution processing shown in FIG. 26, and the normal transaction execution processing is restarted after the transaction status management information is added.

Processing for selecting a transaction case from the transaction status management information table will be described below with reference to FIG. 27.

In the present embodiment, we assume that a case in the transaction status management information table with the first asset/fund ID of "L0005" and the second asset/fund ID of "M0008" is selected.

Next, the transaction issuing device 110B updates secret information among the parameters held by the parameter storage unit 122 (S2902).

In this process, the transaction status management unit 114 of the transaction issuing device 110B reads the transactions held by the executed transaction storage units 155 and 165 of the asset/fund management systems 150 and 160 via the asset/fund settlement device access unit 111. Furthermore, the transaction status management unit 114 extracts from the read transactions, transactions having an asset/fund ID that matches the first asset/fund ID or the second asset/fund ID of the transaction status management information table selected in S2901.

In parallel, the transaction status management unit 114 extracts from the parameter storage unit 122, parameters having the first asset/fund ID and the second asset/fund ID of the transaction status management information table selected in S2901.

When the extracted secret information 727 of the transaction has a corresponding relationship with the hash value of the extracted parameters, the data of the secret information 727 is written in the parameter table as the data of the secret information corresponding to the hash value.

Figure 28:
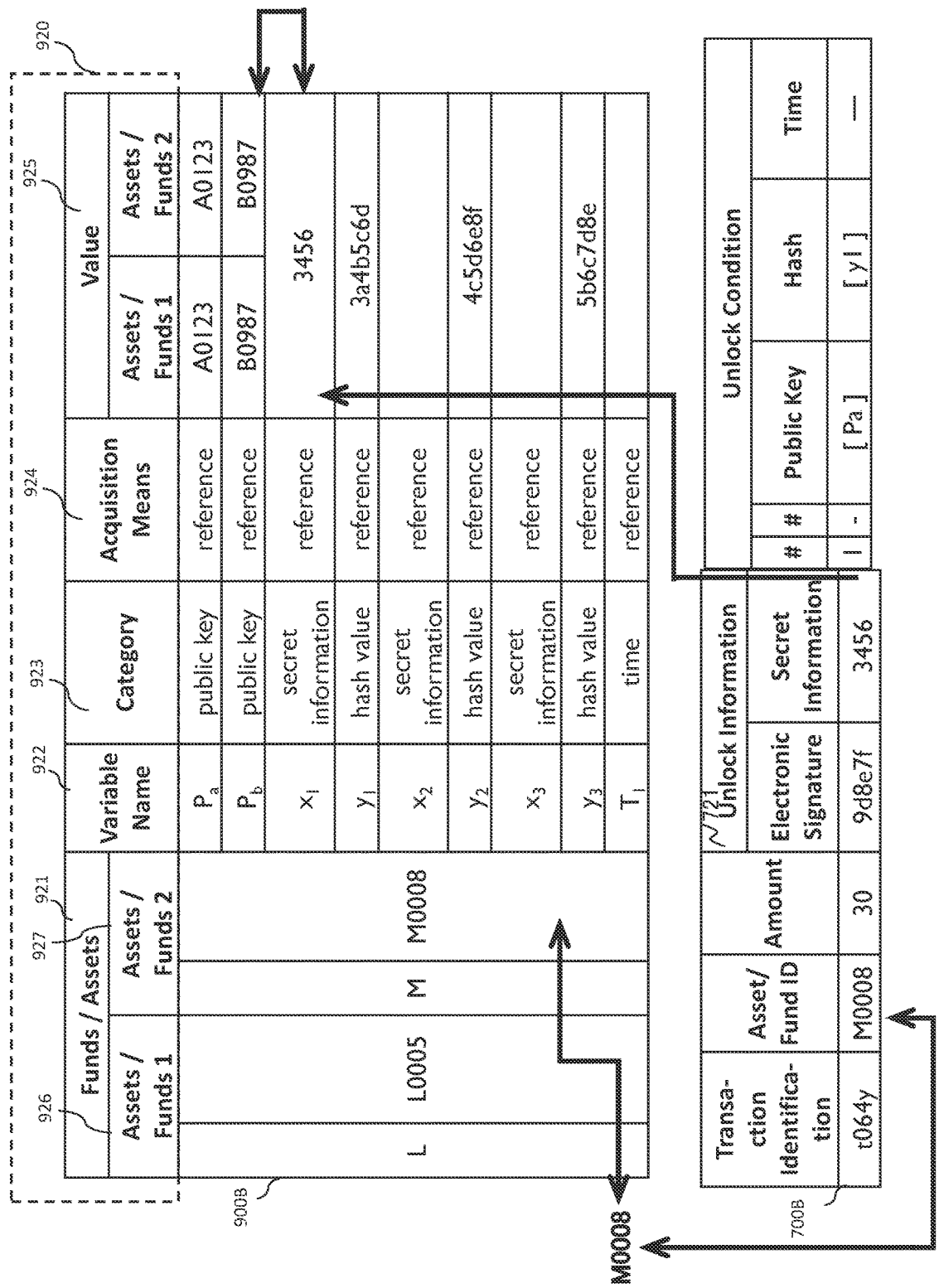
FIG. 28 is a figure which shows one example of the processing which updates secret information.

Processing for updating secret information according to this embodiment will be described below with reference to FIG. 28.

The transaction issuing device 110B extracts transactions having "L0005" or "M0008" as the value of the asset/fund ID 722 from among the transactions held by the executed transaction storage unit.

Figure 21B:
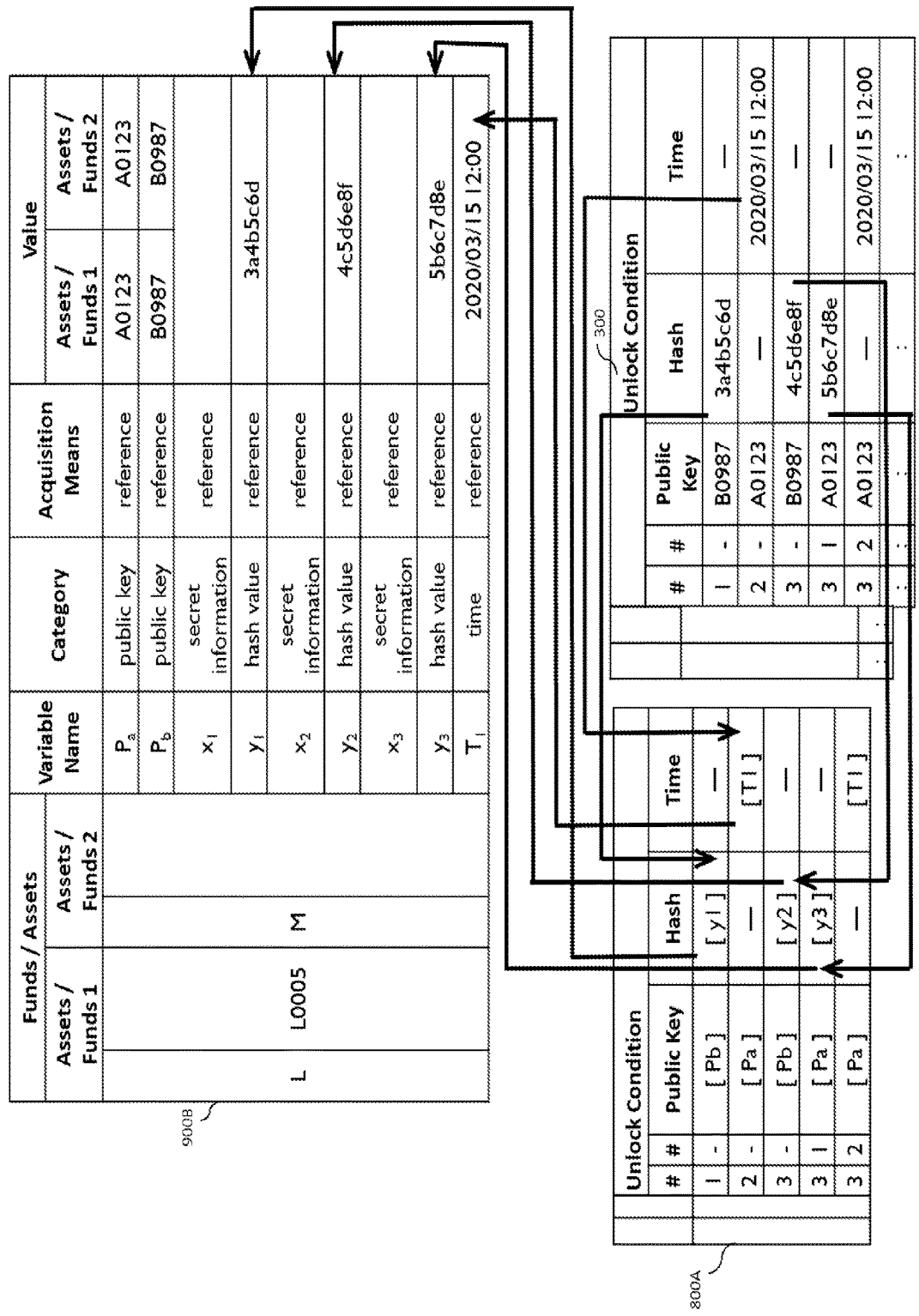
FIG. 21B is a diagram which shows one example of processing for acquiring parameter information (No. 2).

Here, because "3456", which is the extracted secret information 727 of the transaction, has relationship between the input and output values in the hash function (if the hash function is "Hash", $y_1$=Hash($x_1$)) with "3A4B5c6d" (the value has already been set from the initial execution result template 800A, see FIG. 21B), the value 925 of the record whose category 923 is "hash value", the value "3456" is written as the value 925 of the record whose category 923 is "secret information".

Next, the transaction issuing device 110B determines whether or not the case indicated by the transaction status management information selected in S2901 can be executed (S2603).

Figure 29:
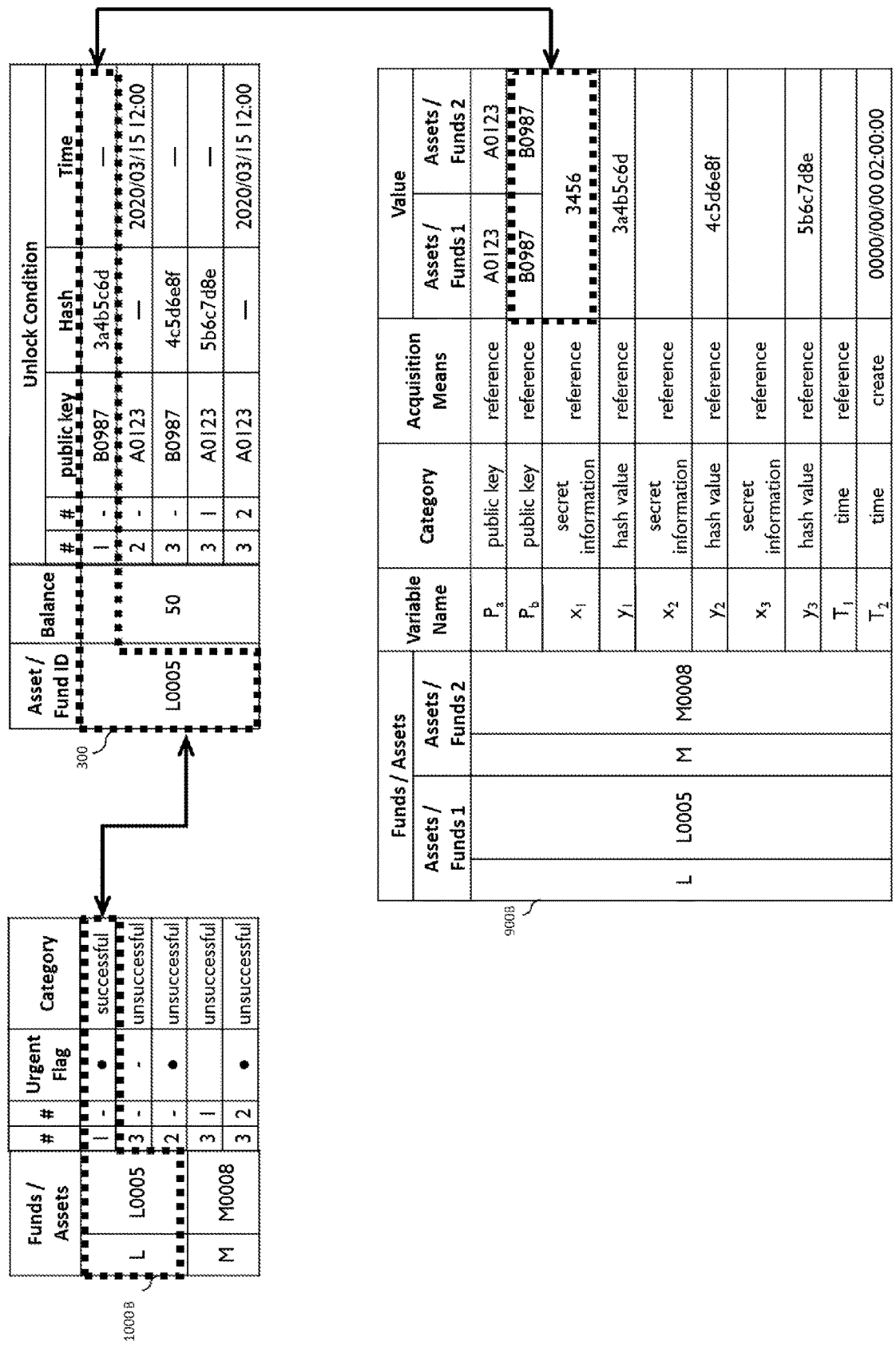
FIG. 29 is a figure which shows one example of the processing which decides execution feasibility concerning the case which selected transaction status management information shows.

Processing for judging whether or not the case indicated by the transaction status management information selected in S2901 can be executed will be described below with reference to FIG. 29.

The transaction issuing device 110B selects one line from among the records of the transaction status management information table selected in S2901. Furthermore, the transaction issuing device 110B acquires the record having the asset/fund ID and unlock condition corresponding to the selected record from the ledger 300 of the ledger storage unit 154 of the asset/fund management system via the asset/fund settlement device access unit 111. Furthermore, the transaction issuing device 110B confirms the feasibility of the transaction by comparing the parameters read from the parameter storage unit and the lock release conditions of the ledger. In FIG. 29, because the secret information "3456" corresponding to the hash value "3A4B5cd" of the lock release condition is included in the parameters, the transaction issuing device 110B can determine that the transaction can be executed.

By performing this processing for all records of the transaction status management information selected in S2901, it is possible to determine whether the selected case can be executed.

Next, user B determines whether or not the transaction determined to be executable in S2903 needs to be executed (S2904).

In this embodiment, among the records of the transaction status management information table, it is determined to execute the transaction corresponding to the record whose item numbers 1022 are [1, -] and [3, -].

Of the records in the transaction status management information table, records with non-empty urgent flags 1023 (marked with "•" in the figure) are mechanically determined to need execution without intervention of the user.

Next, the transaction issuing device 110B creates and executes the transaction determined to be executed in S2904 (S2905).

Transaction execution processing will be described below with reference to FIGS. 30 and 31.

Figure 30:
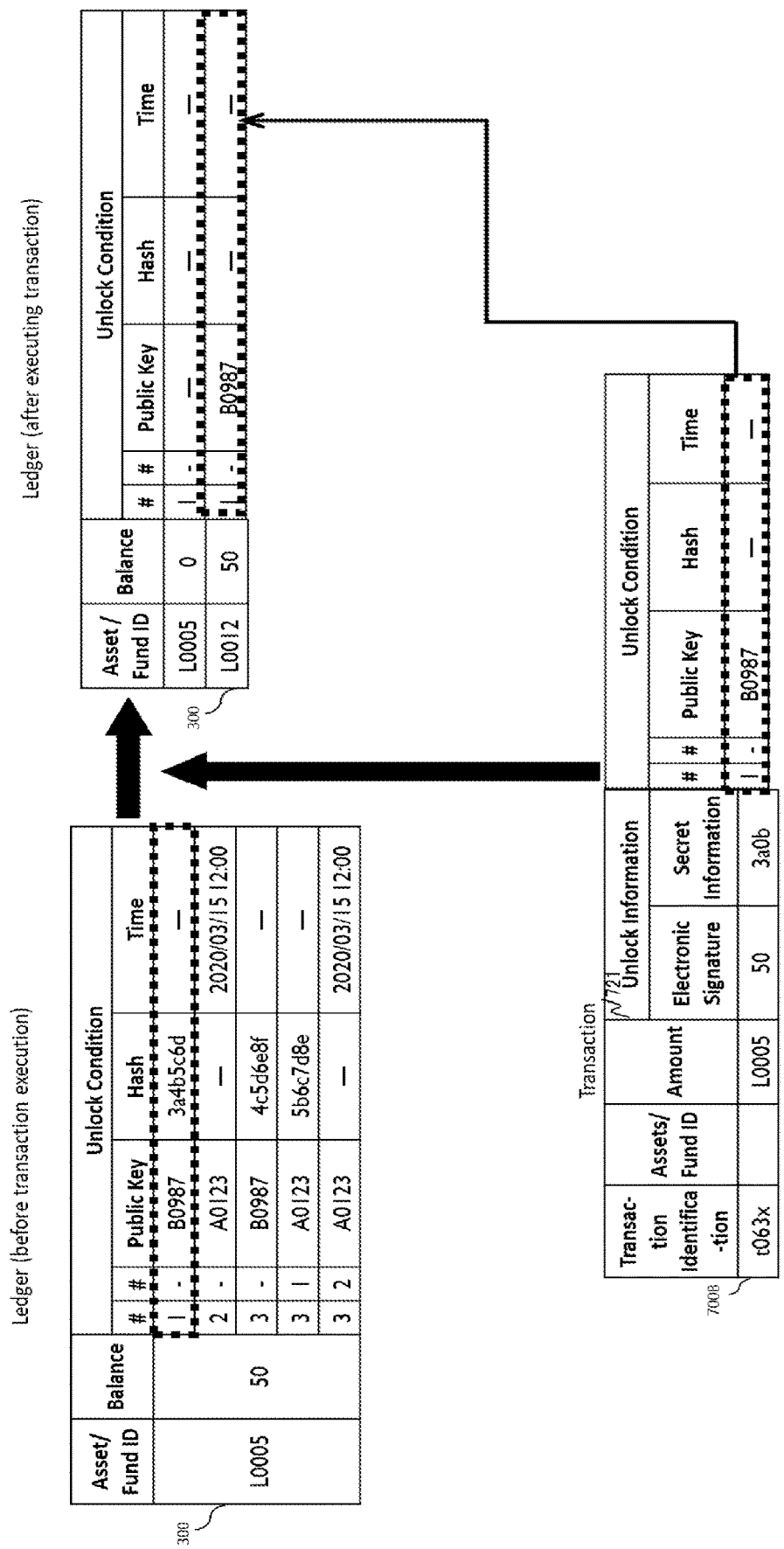
FIG. 30 is a diagram for explaining transaction execution processing (the state of transaction and ledger when a transaction is concluded).

FIG. 30 shows an aspect about a series of transactions and a ledger when a transaction is established.

Here, we assume that user B selects a transaction whose item numbers 1022 is [1, -] among the records of the transaction status management information table.

The transaction execution unit 153 of the asset/fund settlement device 150L stores the record having the asset/fund ID 311 and the lock release condition 313 corresponding to the transaction asset/fund 722 and the lock release information 724 in the ledger 300 held by the ledger storage unit 154. Furthermore, the transaction execution unit 153 updates the ledger 300 after the transaction execution unit 153 confirms that the unlock condition 313 of the extracted record is satisfied by the unlock information 724 of the transaction (the electronic signature is valid with the public key and corresponded to the hash value of the secret information).

As a specific update method, if there is no subsequent record in the lock release condition 313 before update, a record of new asset/fund ID is added, and the value of the balance 312 before update is described in the balance 312, and the information of the lock release condition 725 of the transaction is described in the lock release condition 313, respectively. In addition, in the record of the asset/fund ID before, the balance 312 is updated to zero, and the lock release condition 313 is updated to null (the ledger in FIG. 30 (after transaction execution)).

Next, we assume that user B selects a transaction whose item numbers 1022 is [3, -] from among the records of the transaction status management information table.

Figure 31:
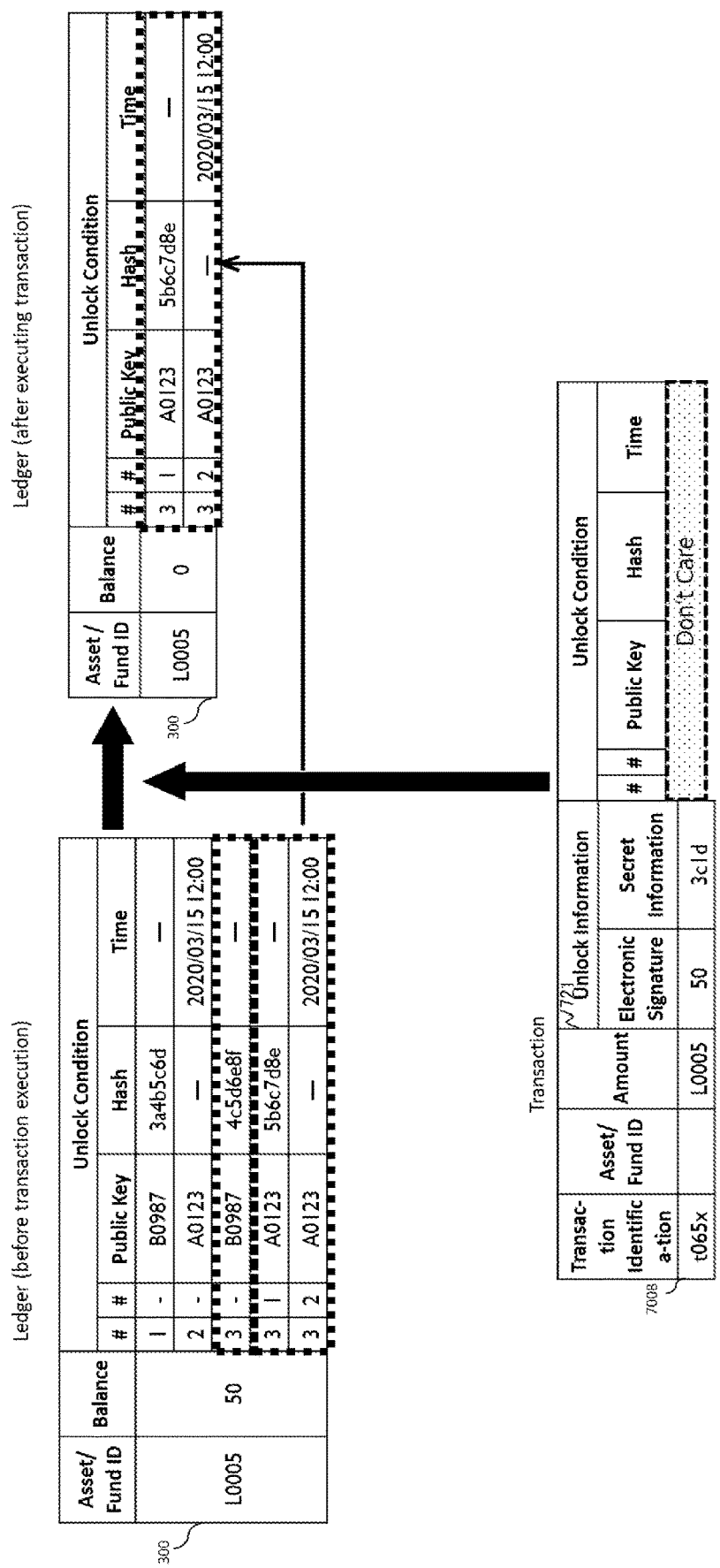
FIG. 31 is a figure which explains the execution processing of transaction (the state of transaction and ledger when transaction is not concluded).

FIG. 31 shows an aspect of the transaction and the ledger when the transaction is not concluded.

The transaction execution unit 153 of the asset/fund settlement device 150L extracts the records having the asset/fund ID 311 and the lock release condition 313 corresponding to the transaction asset/fund 722 and the lock release information 724 in the ledger 300 held by the ledger storage unit 154.

As explained in FIG. 4, transaction execution is specified as the condition of the item number such as the condition of [3, -] followed by the condition of [3, 1] or the condition of [3, -] followed by the condition of [3, 2].

At this time, when the transaction corresponding to [3, -] is executed, as shown in FIG. 31, the unlock condition 313 for the ledger of [3, -], [3, 1], and [3, 2] is replaced with the unlock condition 313 for the ledger of [3, 1], and [3, 2].

As a result, we can assure that, after the transaction of [3, -] is executed, the transaction with an asset/fund ID of "L0005" corresponding to [3, 1], and [3, 2] will be executed.

Next, the transaction issuing device 110B updates the transaction management information (S2906).

The transaction status management unit 114 of the transaction issuing device 110B reads the asset/fund ID from the transaction status management information read in S2901. For each read asset/fund ID, the transaction status management unit 114 acquires the ledger record having the corresponding asset/fund ID via the asset/fund settlement device access unit 111 of the asset/fund settlement device 150L. In the acquired record, if the value of the balance 312 is "0", the record having the asset/fund ID is deleted from the records of the transaction status management information.

As described above, by repeating S2901 to S2906, the ledger is sequentially updated, and the assets/funds L and assets/funds M are transferred.

Next, with reference to FIGS. 32 and 33, a description will be given of the overall series of transactions and an aspect of the ledger in the DvP transaction in this embodiment.

First, with reference to FIG. 32, the entire series of transactions and an aspect of the ledger when the DvP transaction is established will be described.

As a result of a series of processing of the first initial transaction execution processing in the electronic payment system shown in FIG. 12 and the second initial transaction execution processing in the electronic payment system shown in FIG. 19, the ledger record 3501 and the ledger record 3502 are stored in the ledger storage unit 154 of the fund settlement device 150L and asset/fund settlement device 150M, respectively. Thereafter, using information 3503 held by the transaction issuing device 110 of user A (based on the parameter table and key information table), a transaction 3504 is created and transmitted.

On the other hand, as a result of processing the transaction 3504 by the asset/fund settlement device 150M, the ledger is updated according to the ledger record 3505, and the information 3506 held by the transaction issuing device 110B of the user B is updated from the information of the executed transaction. As a result of updating the information 3506 held by the transaction issuing device, user B can now issue a transaction 3507 and the ledger is updated according to the ledger record 3508.

The ledger record 3505, which i.e., is assets/funds M held by user A, can be transferred by user A's electronic signature. Furthermore, the ledger records 3508 which i.e., is assets/funds L held by user B, can be transferred by user B's electronic signature.

Next, with reference to FIG. 33, the overall series of transactions and an aspect of the ledger when the transaction is not concluded will be described.

Figure 32:
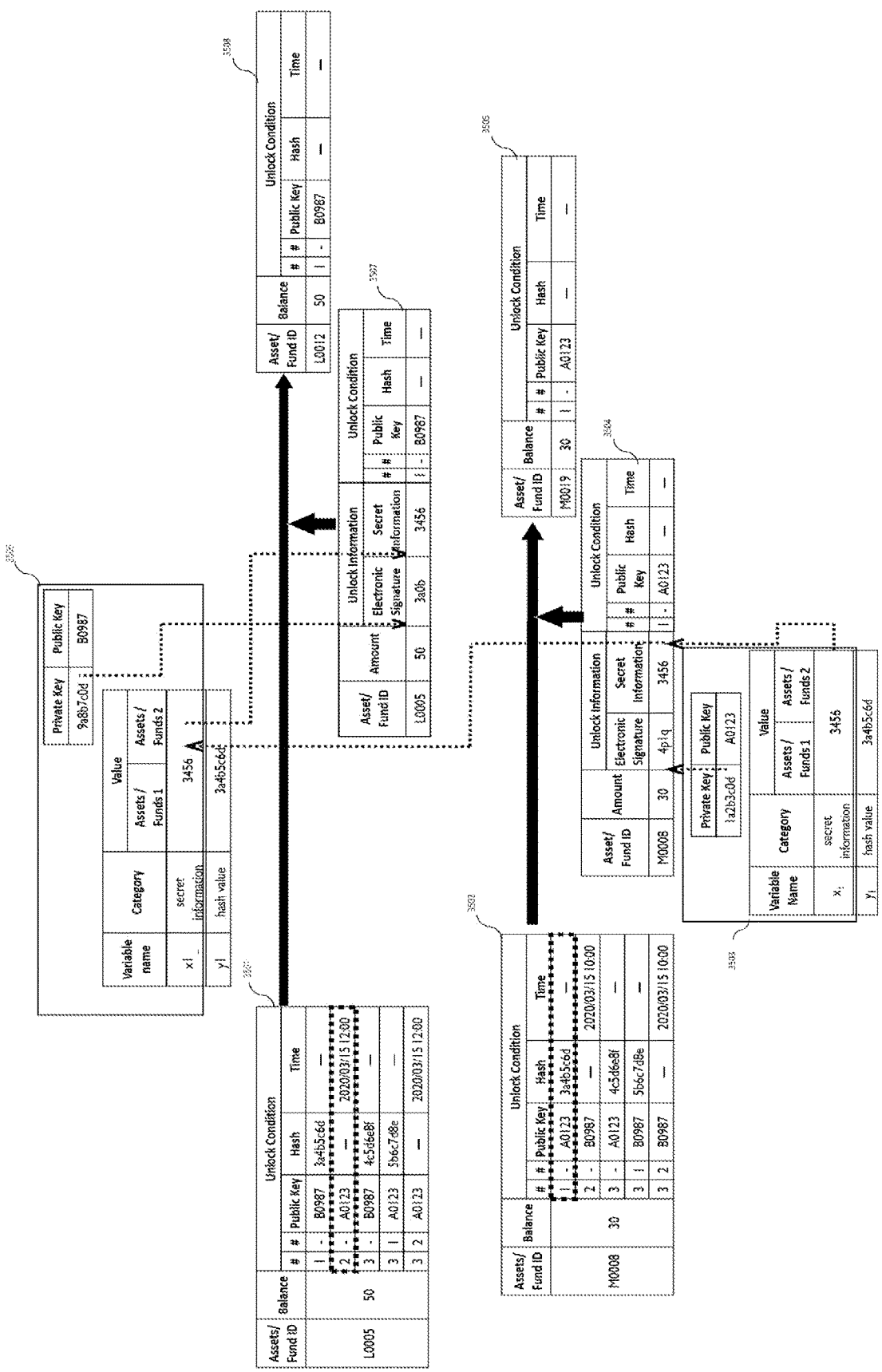
FIG. 32 is a figure which shows the entire state of series of transactions and ledger when the transaction is concluded.
Figure 33:
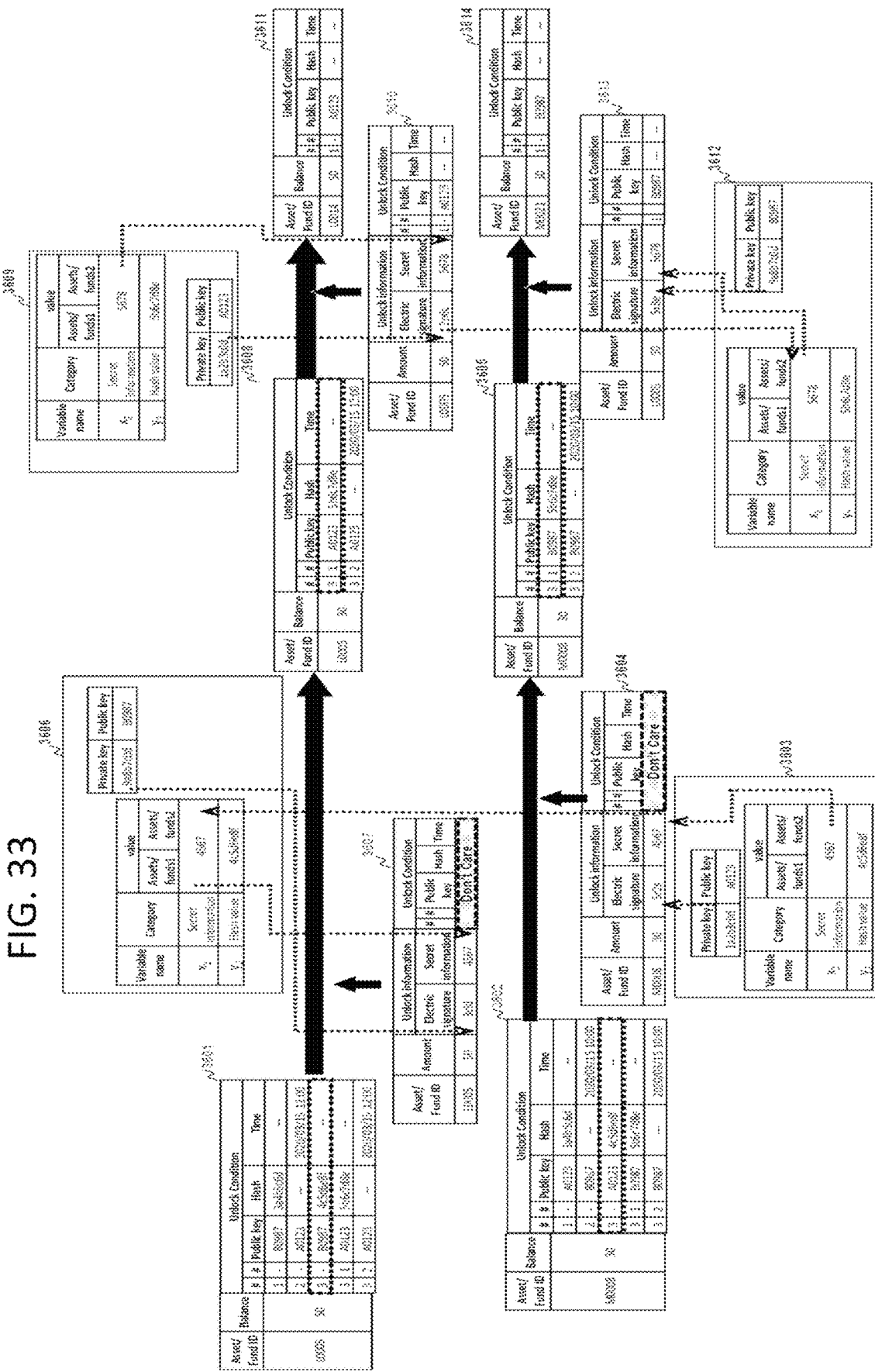
FIG. 33 is a figure which shows the entire state of series of transactions and ledger when the transaction is not concluded.

The concept of the basic flow of processing is the same as the transaction when the DvP transaction shown in FIG. 32 is established.

Note that ledger records 3601 and 3602 are in escrow state, and ledger 3608 and ledger 3605 are in cancel escrow state.

The ledger record 3611, which i.e., is assets/funds L held by user A, can be transferred by user A's electronic signature. Furthermore, the ledger records 3614 which i.e., is assets/funds M held by user B, can be transferred by user B's electronic signature.

The features of the electronic payment system according to this embodiment are described below:

In conventional transactions, as shown in the DvP transaction pattern when the transaction is not completed in FIG. 11, the transaction issuer (electronic signature owner) and the transfer destination of funds/assets had to be the same. (FIG. 11: state transition (transition condition) 1122 etc. such as escrow state 1112->end state 1113).

to the present embodiment, the transaction issuer (electronic signature owner) and the transfer destination of funds/assets can be allowed to be different (FIG. 10: state transition (transition condition) 624 etc. such as escrow state 612->cancel escrow state 624).

In order to achieve this, in the electronic payment system according to the present embodiment, a transaction is provided with an unlock condition that includes a transfer destination (corresponding to a public key), and transaction patterns of the transaction, such as [3, -], [3, 1] or [3, -], [3, 2], which must be executed continuously.

As a result, the electronic payment system of the present embodiment extends HTLC and provides a mechanism for safely withdrawing locked assets without depending on timeout. That is, for example, when the parties to transactions perform DvP transactions across multiple asset/fund settlement devices and without an intermediary, while ensuring the safety of the transaction, the liquidity of the assets/funds can be avoided to decrease when the transaction fails.

DESCRIPTION OF SYMBOLS

100 . . . Electronic payment system
110 . . . Transaction issuing device
111 . . . Asset/fund settlement device access unit
112 . . . Shared area access unit
113 . . . Transaction issuing unit
114 . . . Transaction status management department
121 . . . Key information storage unit
122 . . . Parameter storage unit
123 . . . Transaction status management information storage unit
124 . . . Transaction-in-process storage unit
150 . . . Asset/fund settlement device
151 . . . Transaction reception unit
152 . . . Transaction executability determination unit
153 . . . Transaction execution unit
154 . . . Ledger storage unit
155 . . . Executed transaction storage unit
156 . . . Pre-execution transaction storage unit
180 . . . Shared area
181 . . . DvP transaction template storage unit

The invention claimed is:

1. An electronic payment system comprising:
a transaction issuing device for issuing transactions relating to assets/funds;
an asset/fund settlement device connected to said transaction issuing device via a network and configured to settle assets/funds based on transactions issued by said transaction issuing device; and
a shared storage area in communication with the transaction issuing device and the asset/fund settlement device, the shared storage area storing a plurality of templates including a first transaction template for generating a first transaction and a second transaction template for generating a second transaction, the first and second transaction templates indicating respective attributes of the first transaction and the second transaction, the respective attributes including a transaction identifier (ID), asset/fund ID, an amount, unlock information, and unlock conditions, wherein
each transaction of the transactions has a quantity of assets/funds, the unlock information including an electronic signature of a transaction issuer, and the unlock conditions including a trader's public key,
said first transaction generated by the transaction issuing device and corresponding to the first transaction template includes records holding multiple consecutive unlock conditions,
the unlock condition for said first transaction includes public key information related to an electronic signature different from that of said transaction issuer,
said asset/fund settlement device posts said first transaction issued by said transaction issuing device to a ledger, determines whether or not the second transaction corresponding to the second transaction template and issued after said first transaction can be executed by means of collating unlock information and unlock condition posted to said ledger with unlock information and unlock condition of the second transaction when posted to said ledger, according to the order of the plurality of consecutive unlock conditions of said first transaction, and executes said second transaction based at least on the second transaction having been determined to be executable.

2. The electronic payment system according to claim 1, wherein said transaction unlock information further comprises secret information;
wherein said transaction unlock condition of said transaction comprises a hash value for said secret information of said transaction unlock information; and
wherein said unlock condition for said first transaction includes a hash value different from secret information held by said transaction issuer.

3. The electronic payment system according to claim 2, wherein, in transactions that a first trader owning a first asset/fund and a second trader owning a second asset/fund exchange the first asset/fund and the second asset/fund respectively, the unlock information of the transaction issued when said first trader cancels a transaction, includes an electronic signature and secret information included in a transaction issued by said second trader.

4. The electronic payment system according to claim 1, wherein said transaction issuing device has a transaction status management table corresponding to the transactions issued by said transaction issuing device;

wherein records in the transaction status management table are categorize with "urgent" and "non-urgent"; and wherein said transaction issuing device preferentially issues a transaction corresponding to a record designated as "urgent".

5. An electronic payment method by an electronic payment system having a transaction issuing device for issuing transactions relating to assets/funds, an asset/fund settlement device connected to said transaction issuing device via a network for performing settlement of assets/funds based on transactions issued by said transaction issuing device, and a shared storage area in communication with the transaction issuing device and the asset/fund settlement device, the shared storage area storing a plurality of templates including a first transaction template for generating a first transaction and a second transaction template for generating a second transaction, the first and second transaction templates indicating respective attributes of the first transaction and the second transaction, the respective attributes including a transaction identifier (ID), asset/fund ID, an amount, unlock information, and unlock conditions, each transaction of the transactions has a quantity of assets/funds, the unlock information including an electronic signature of a transaction issuer and secret information, and the unlock conditions including a trader's public key and a hash value of said unlock information, said first transaction generated by the transaction issuing device and corresponding to the first transaction template includes records holding multiple consecutive unlock conditions, said unlock condition for said first transaction includes public key information related to an electronic signature different from that of said transaction issuer, said electronic payment method comprising:

posting, by said asset/fund settlement device, the first transaction issued by said transaction issuing device to a ledger; and determining, by said asset/fund settlement device, whether or not the second transaction corresponding to the second transaction template and issued after the first transaction can be executed, by means of collating the unlock information and unlock condition posted to said ledger with the unlock information and unlock condition of the second transaction when posted to said ledger, according to the order of the plurality of consecutive unlock conditions of said first transaction, and executing the second transaction based at least one the second transaction having been determined to be executable.

* * * * *